US012607325B2

(12) United States Patent
Chien

(10) Patent No.: US 12,607,325 B2
(45) Date of Patent: Apr. 21, 2026

(54) CONTROL DEVICE OF ILLUMINATION DEVICE

(71) Applicant: Japan Display Inc., Tokyo (JP)

(72) Inventor: Chiehan Chien, Tokyo (JP)

(73) Assignee: Japan Display Inc., Tokyo (JP)

( * ) Notice: Subject to any disclaimer, the term of this patent is extended or adjusted under 35 U.S.C. 154(b) by 232 days.

(21) Appl. No.: 18/657,992

(22) Filed: May 8, 2024

(65) Prior Publication Data

US 2024/0318806 A1 Sep. 26, 2024

Related U.S. Application Data

(63) Continuation of application No. PCT/JP2022/031789, filed on Aug. 24, 2022.

(30) Foreign Application Priority Data

Nov. 10, 2021 (JP) ................................ 2021-183602

(51) Int. Cl.
*F21V 14/00* (2018.01)
*H05B 47/175* (2020.01)
*H05B 47/19* (2020.01)

(52) U.S. Cl.
CPC ........... *F21V 14/003* (2013.01); *H05B 47/19* (2020.01); *H05B 47/1965* (2024.01)

(58) Field of Classification Search
CPC ........ G02F 1/0105; G02F 1/13; G02F 1/1323; G02F 1/1336; G02F 1/133606;
(Continued)

(56) References Cited

U.S. PATENT DOCUMENTS

2016/0258599 A1* 9/2016 Genthon ............... F21V 14/003

FOREIGN PATENT DOCUMENTS

JP H0265001 A 3/1990
JP 2014085902 A 5/2014
(Continued)

OTHER PUBLICATIONS

International Search Report from corresponding PCT application PCT/JP2022/031789, dated Oct. 25, 2022.
(Continued)

*Primary Examiner* — Koosha Sharifi-Tafreshi
(74) *Attorney, Agent, or Firm* — K&L Gates LLP

(57) ABSTRACT

A detection device provided with a diffusion degree adjustment region of an illumination device in a detection region where a plurality of detection elements are provided, and a processing device configured to control a diffusion degree change amount of the illumination device in accordance with a movement amount of a touch detection position in the diffusion degree adjustment region are provided. The processing device calculates the diffusion degree change amount corresponding to a first directional component of the movement amount of the touch detection position in the diffusion degree adjustment region, and calculates the diffusion degree change amount corresponding to a second directional component of the movement amount of the touch detection position in the diffusion degree adjustment region, the second directional component being different from the first directional component.

10 Claims, 27 Drawing Sheets

(58) Field of Classification Search
CPC ............. G02F 1/133603; G02F 1/1347; G02F 2203/18; G02F 2203/24; G02F 1/13338; F21V 14/003; G06F 3/044; G06F 3/04883; G06F 3/0412; H05B 47/105; H05B 47/155
See application file for complete search history.

(56) References Cited

FOREIGN PATENT DOCUMENTS

| | | | |
|---|---|---|---|
| JP | 2014093147 | A | 5/2014 |
| JP | 2019028320 | A | 2/2019 |
| KR | 10-2011-0037038 | A | 4/2011 |

OTHER PUBLICATIONS

Request for the Submission of an Opinion from corresponding Korean Patent Application No. 10-2024-7014918, dated Feb. 13, 2025. 9 pages.

* cited by examiner

CONTROL DEVICE OF ILLUMINATION DEVICE

CROSS-REFERENCE TO RELATED APPLICATION(S)

This application is a continuation of PCT international application Ser. No. PCT/JP2022/031789 filed on Aug. 24, 2022 which designates the United States, incorporated herein by reference, and which claims the benefit of priority from Japanese Patent Application No. 2021-183602, filed on Nov. 10, 2021, incorporated herein by reference.

BACKGROUND

1. Technical Field

The present disclosure relates to a control device of an illumination device.

2. Description of the Related Art

In a conventional illumination instrument, a light source such as an LED is combined with a thin lens provided with a prism pattern, and the distance between the light source and the thin lens is changed to change a light distribution angle. For example, an illumination instrument is disclosed in which the front of a transparent light bulb is covered by a liquid crystal light adjustment element, and the transmittance of a liquid crystal layer is changed to switch directly reaching light and scattering light.

For example, in an illumination device including a liquid crystal cell for p wave polarization and a liquid crystal cell for s wave polarization, the diffusion degree of light in two directions can be controlled by driving the respective liquid crystal cells. A control device is desired that can freely change the irradiation area of light from such an illumination device, which can control the diffusion degree of light in a plurality of directions, by controlling the diffusion degree of light from the illumination device in the directions.

The present disclosure is intended to provide a control device of an illumination device capable of freely changing the irradiation area of light.

SUMMARY

A control device of an illumination device according to an embodiment of the present disclosure capable of controlling a diffusion degree of light emitted from a light source, the control device comprising: a detection device provided with a diffusion degree adjustment region of the illumination device in a detection region where a plurality of detection elements are provided; and a processing device configured to control a diffusion degree change amount of the illumination device in accordance with a movement amount of a touch detection position in the diffusion degree adjustment region, wherein the processing device calculates the diffusion degree change amount corresponding to a first directional component of the movement amount of the touch detection position in the diffusion degree adjustment region, and calculates the diffusion degree change amount corresponding to a second directional component of the movement amount of the touch detection position in the diffusion degree adjustment region, the second directional component being different from the first directional component.

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

Figure 1A:
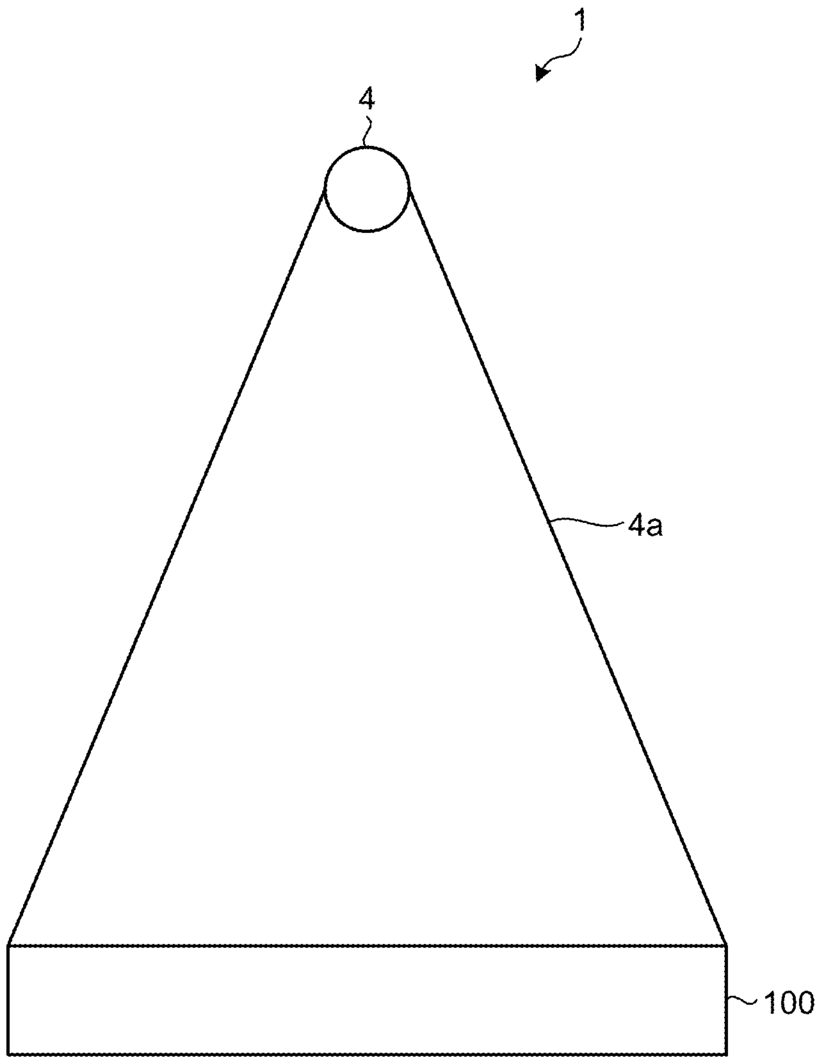
FIG. 1A is a side view illustrating an example of an illumination device according to an embodiment.
Figure 1B:
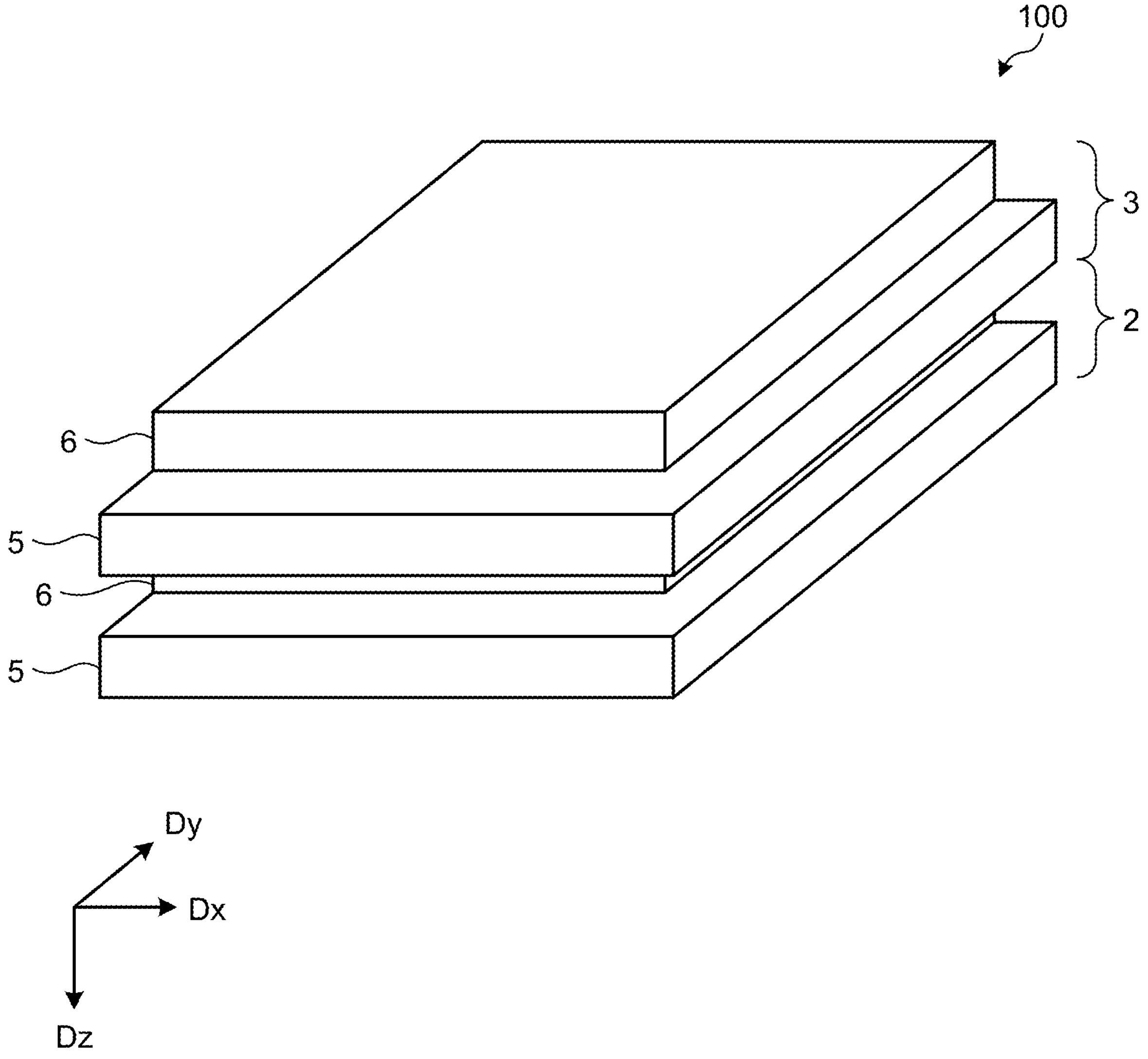
FIG. 1B is a perspective view illustrating an example of a light modulation device according to the embodiment.

FIG. 1A is a side view illustrating an example of an illumination device according to an embodiment. FIG. 1B is a perspective view illustrating an example of a light modulation device according to the embodiment. As illustrated in FIG. 1A, an illumination device 1 includes a light source 4, a reflector 4*a*, and a light modulation device 100. As illustrated in FIG. 1B, the light modulation device 100 includes a first liquid crystal cell 2 and a second liquid crystal cell 3. The light source 4 is constituted by, for example, a light emitting diode (LED). The reflector 4*a* is a component through which light from the light source 4 is condensed to the light modulation device 100.

In FIG. 1B, a Dz direction represents the irradiation direction of light from the light source 4 and the reflector 4*a*. The light modulation device 100 is constituted by stacking the first liquid crystal cell 2 and the second liquid crystal cell 3 in the Dz direction. In FIG. 1B, one direction in a plane parallel to a stacking plane of the first liquid crystal cell 2 and the second liquid crystal cell 3 orthogonal to the Dz direction is defined as a Dx direction, and a direction orthogonal to the Dx direction and the Dz direction is defined as a Dy direction.

The first liquid crystal cell 2 and the second liquid crystal cell 3 have the same configuration. In the present embodiment, the first liquid crystal cell 2 is a liquid crystal cell for p wave polarization. The second liquid crystal cell 3 is a liquid crystal cell for s wave polarization. Note that the first liquid crystal cell 2 may be a liquid crystal cell for s wave polarization, and the second liquid crystal cell 3 may be a liquid crystal cell for p wave polarization. It is only needed that one of the first liquid crystal cell 2 and the second liquid crystal cell 3 is a liquid crystal cell for p wave polarization and the other is a liquid crystal cell for s wave polarization.

Figure 2:
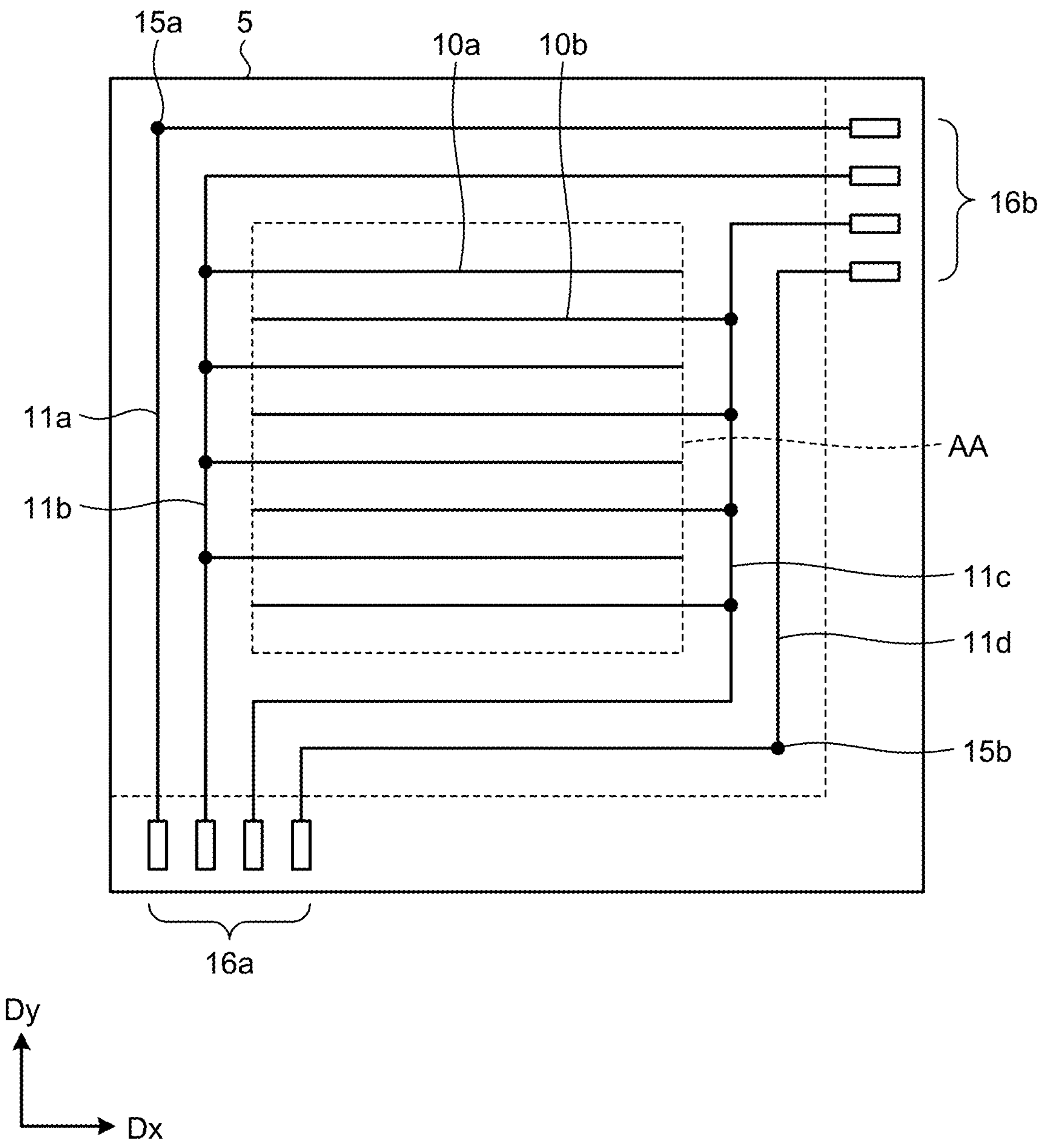
FIG. 2 is a schematic plan view of a first substrate when viewed in a Dz direction.
Figure 3:
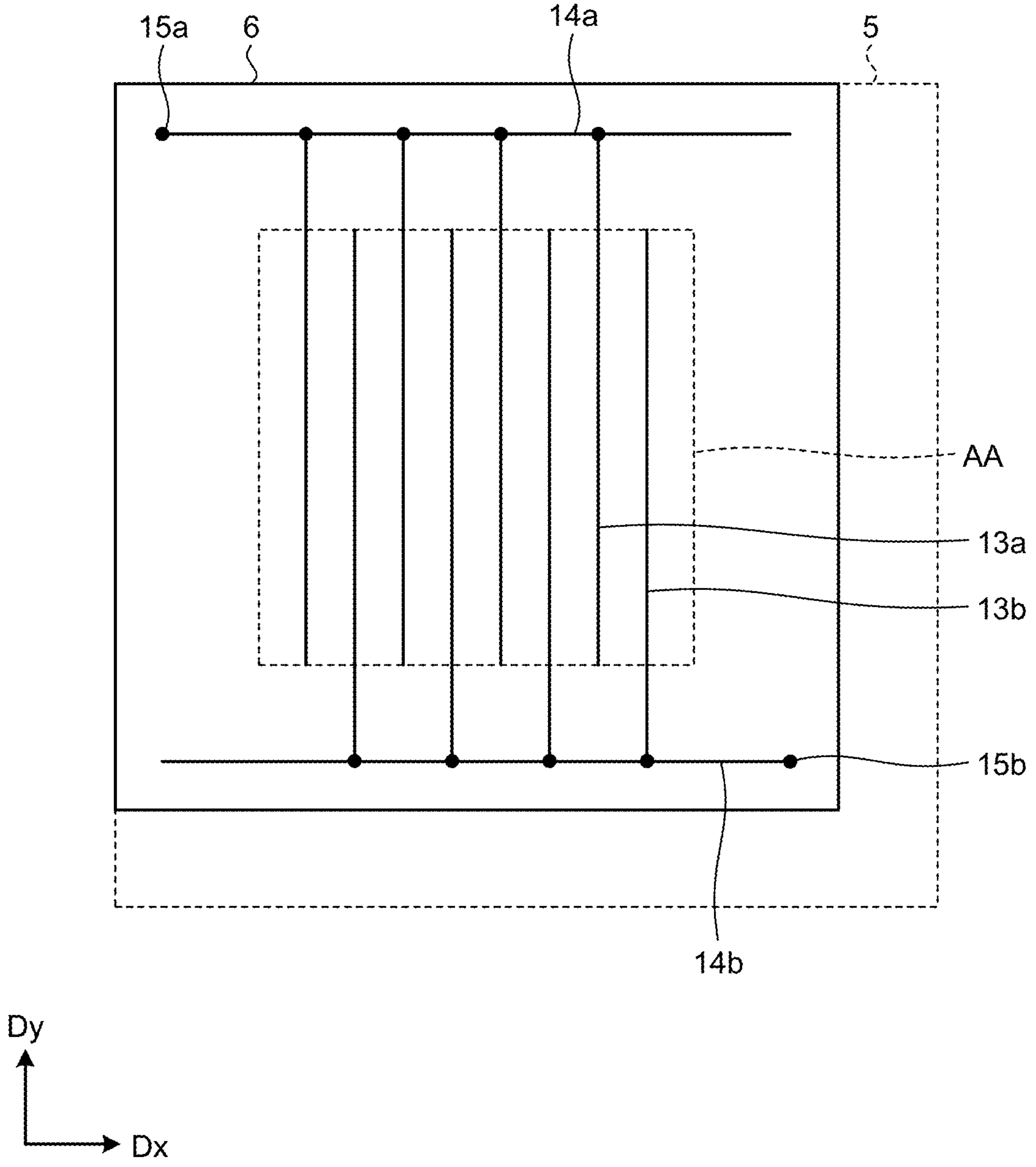
FIG. 3 is a schematic plan view of a second substrate when viewed in the Dz direction.
Figure 4:
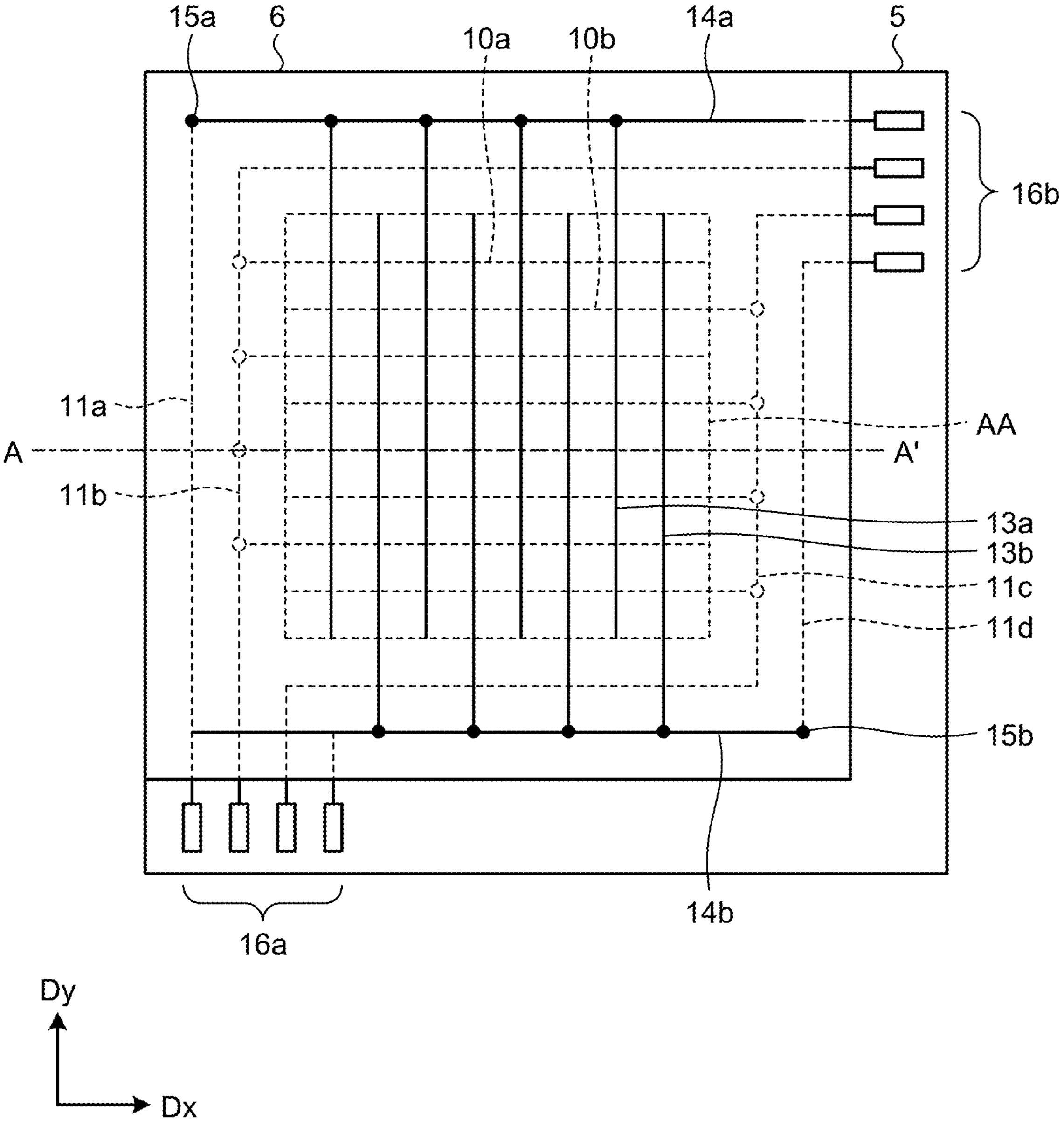
FIG. 4 is a fluoroscopic diagram of a liquid crystal cell in which the first substrate and the second substrate are placed over in the Dz direction.
Figure 5:
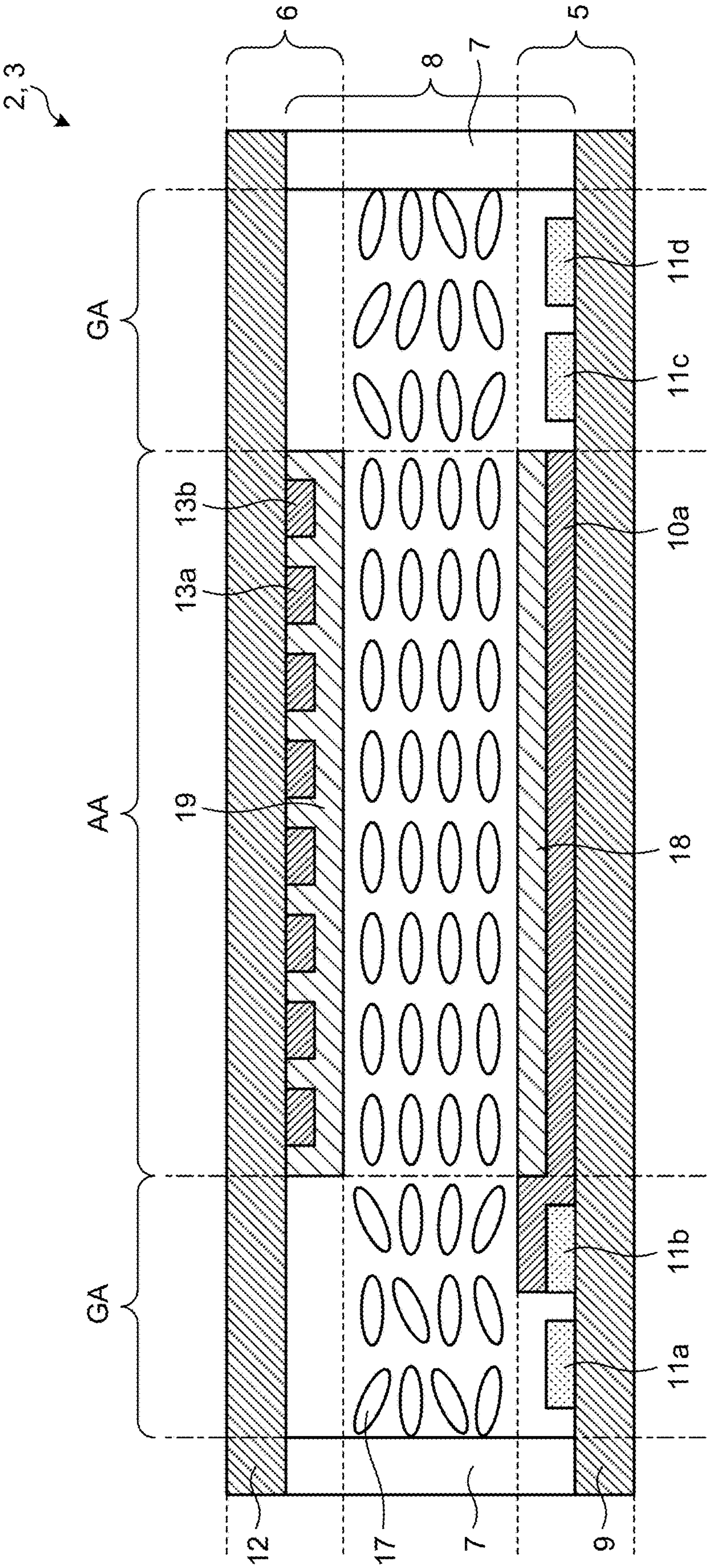
FIG. 5 is a sectional view along line A-A' illustrated in FIG. 4.

The first liquid crystal cell 2 and the second liquid crystal cell 3 each include a first substrate 5 and a second substrate 6. FIG. 2 is a schematic plan view of the first substrate when viewed in the Dz direction. FIG. 3 is a schematic plan view of the second substrate when viewed in the Dz direction. FIG. 4 is a fluoroscopic diagram of a liquid crystal cell in which the first substrate and the second substrate are placed over in the Dz direction. FIG. 5 is a sectional view along line A-A' illustrated in FIG. 4.

As illustrated in FIG. 5, the first liquid crystal cell 2 and the second liquid crystal cell 3 each include a liquid crystal layer 8 having a periphery sealed by a sealing member 7 between the first substrate 5 and the second substrate 6.

The liquid crystal layer 8 modulates light passing through the liquid crystal layer 8 in accordance with the state of electric field. The liquid crystal layer 8 may be, for example, of a horizontal electric field mode such as fringe field switching (FFS), which is a form of in-plane switching (IPS), or may be of a vertical electric field mode. Liquid crystal of various modes such as twisted nematic (TN), vertical alignment (VA), and electrically controlled birefringence (ECB) may be used and is not limited by the kind and configuration of the liquid crystal layer 8.

As illustrated in FIG. 2, a plurality of drive electrodes 10*a* and 10*b*, a plurality of metal wires 11*a* and 11*b* that supply drive voltage applied to these drive electrodes 10, and a plurality of metal wires 11*c* and 11*d* that supply drive voltage applied to a plurality of drive electrodes 13*a* and 13*b* (refer to FIG. 3) provided at the second substrate 6 to be described later are provided on the liquid crystal layer 8 side of a base material 9 of the first substrate 5 illustrated in FIG. 5. The metal wires 11*a*, 11*b*, 11*c*, and 11*d* are provided in a wiring layer of the first substrate 5. The metal wires 11*a*, 11*b*, 11*c*, and 11*d* are provided at intervals in the wiring layer on the first substrate 5. Hereinafter, the drive electrodes 10*a* and 10*b* are simply referred to as "drive electrodes 10" in some cases. In addition, the metal wires 11*a*, 11*b*, 11*c*, and 11*d* are referred to as "first metal wires 11" in some cases. As illustrated in FIG. 2, the drive electrodes 10 on the first substrate 5 extend in the Dx direction.

As illustrated in FIG. 3, the drive electrodes 13*a* and 13*b* and a plurality of metal wires 14*a* and 14*b* that supply drive voltage applied to these drive electrodes 13 are provided on the liquid crystal layer 8 side of a base material 12 of the second substrate 6 illustrated in FIG. 5. The metal wires 14*a* and 14*b* are provided in a wiring layer of the second substrate 6. The metal wires 14*a* and 14*b* are provided at intervals in the wiring layer on the second substrate 6. Hereinafter, the drive electrodes 13*a* and 13*b* are simply referred to as "drive electrodes 13" in some cases. In addition, the metal wires 14*a* and 14*b* are referred to as "second metals wire 14" in some cases. As illustrated in FIG. 3, the drive electrodes 13 on the second substrate 6 extend in the Dy direction.

The drive electrodes 10 and 13 are translucent electrodes formed of a translucent conductive material (translucent conductive oxide) such as indium tin oxide (ITO). The first substrate 5 and the second substrate 6 are translucent substrates of glass, resin, or the like. The first metal wires 11 and the second metal wires 14 are formed of at least one metallic material among aluminum (Al), copper (Cu), silver (Ag), molybdenum (Mo), and alloy thereof. The first metal wires 11 and the second metal wires 14 may be each formed of one or more of these metallic materials as a multilayered body of a plurality of layers. The at least one metallic material among aluminum (Al), copper (Cu), silver (Ag), molybdenum (Mo), and alloy thereof has a resistance lower than that of translucent conductive oxide such as ITO.

The metal wire 11*a* of the first substrate 5 and the metal wire 14*a* of the second substrate 6 are coupled to each other through a conduction part 15*a* such as a via. The metal wire 11*d* of the first substrate 5 and the metal wire 14*b* of the second substrate 6 are coupled to each other through a conduction part 15*b* such as a via.

Coupling (Flex-on-Board) terminal parts 16*a* and 16*b* coupled to non-illustrated flexible printed circuits (FPC) are provided in a region on the first substrate 5, which does not overlap the second substrate 6 in the Dz direction. The coupling terminal parts 16*a* and 16*b* each include four coupling terminals corresponding to the metal wires 11*a*, 11*b*, 11*c*, and 11*d*.

The coupling terminal parts 16*a* and 16*b* are provided in the wiring layer of the first substrate 5. Drive voltage applied to the drive electrodes 10*a* and 10*b* on the first substrate 5 and the drive electrodes 13*a* and 13*b* on the second substrate 6 is supplied from the FPC coupled to the coupling terminal part 16*a* or 16*b* to the first liquid crystal cell 2 and the second liquid crystal cell 3. Hereinafter, the coupling terminal parts 16*a* and 16*b* are simply referred to as "coupling terminal parts 16" in some cases.

As illustrated in FIG. 4, in the first liquid crystal cell 2 and the second liquid crystal cell 3, the first substrate 5 overlaps the second substrate 6 in the Dz direction (light irradiation direction), and the drive electrodes 10 on the first substrate 5 intersect the drive electrodes 13 on the second substrate 6 when viewed in the Dz direction. In the first liquid crystal cell 2 and the second liquid crystal cell 3 thus configured, the orientation direction of liquid crystal molecules 17 in the liquid crystal layer 8 can be controlled by supplying drive voltage to each of the drive electrodes 10 on the first substrate 5 and the drive electrodes 13 on the second substrate 6. A region in which the orientation direction of the liquid crystal molecules 17 in the liquid crystal layer 8 be can controlled is referred to as a "light modulation region AA". Light transmitting through the light modulation region AA of each of the first liquid crystal cell 2 and the second liquid crystal cell 3 can be controlled with change of refractive index distribution of the liquid crystal layer 8 in the light modulation region AA. A region outside the light modulation region AA where the liquid crystal layer 8 is sealed by the sealing member 7 is referred to as a "peripheral region GA" (refer to FIG. 5).

As illustrated in FIG. 5, the drive electrodes 10 (in FIG. 5, the drive electrode 10*a*) are covered by an alignment film 18 in the light modulation region of the first substrate 5. In addition, the drive electrodes 13 (in FIG. 5, the drive electrodes 13*a* and 13*b*) are covered by an alignment film 19 in the light modulation region of the second substrate 6. The alignment film 18 and the alignment film 19 have different rubbing directions.

Figure 6A:
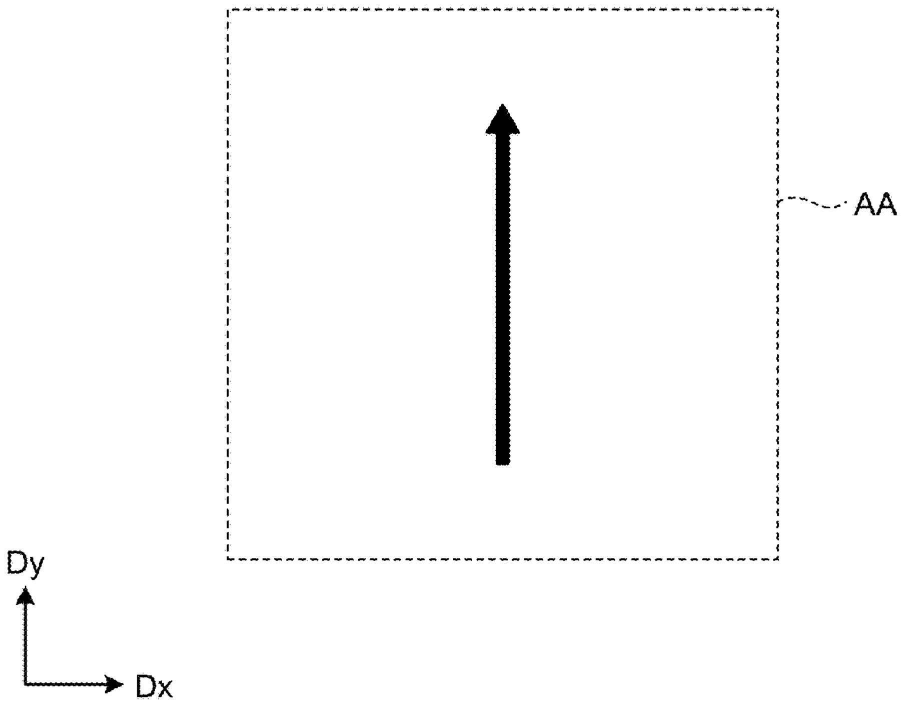
FIG. 6A is a diagram illustrating a rubbing direction of an alignment film of the first substrate.
Figure 6B:
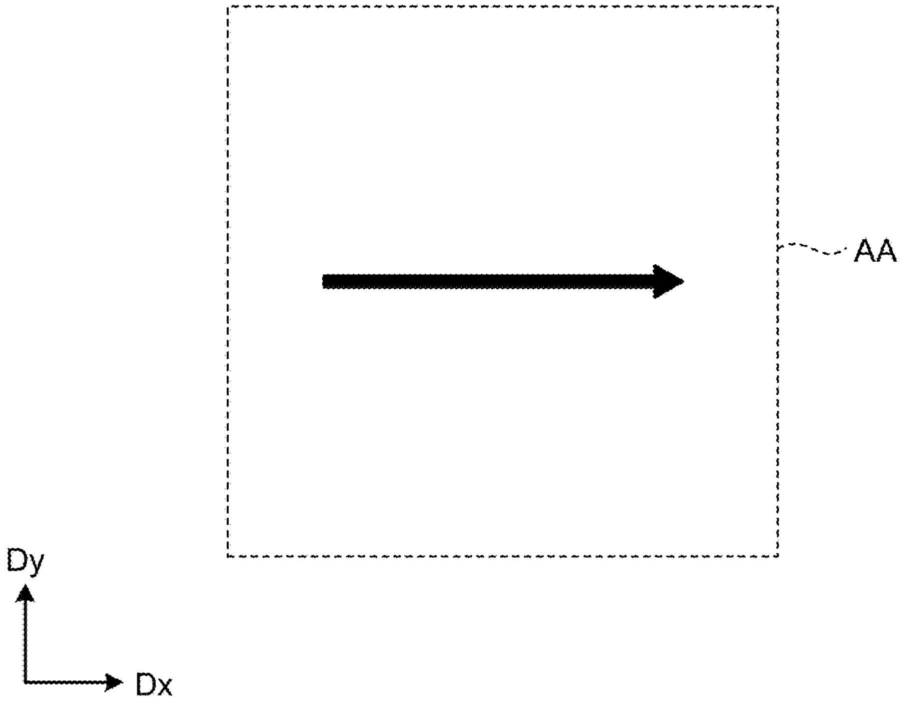
FIG. 6B is a diagram illustrating a rubbing direction of an alignment film of the second substrate.

FIG. 6A is a diagram illustrating the rubbing direction of the alignment film of the first substrate. FIG. 6B is a diagram illustrating the rubbing direction of the alignment film of the second substrate.

As illustrated in FIGS. 6A and 6B, the rubbing direction of the alignment film 18 of the first substrate and the rubbing direction of the alignment film 19 of the second substrate are directions intersecting each other in a plan view. Specifically, the rubbing direction of the alignment film 18 of the first substrate 5 illustrated in FIG. 6A is orthogonal to the extension direction of the drive electrodes 10*a* and 10*b*. The rubbing direction of the alignment film 19 of the second substrate 6 illustrated in FIG. 6B is orthogonal to the extension direction of the drive electrodes 13*a* and 13*b*.

Note that, the present embodiment describes the configuration in which one first liquid crystal cell 2 and one second liquid crystal cell 3 are stacked, but is not limited to this configuration, and for example, a configuration including a plurality of combinations of the first liquid crystal cell 2 and the second liquid crystal cell 3 stacked on each other is also applicable. For example, a configuration including two combinations of the first liquid crystal cell 2 and the second liquid crystal cell 3 stacked on each other, in other words, a configuration including two liquid crystal cells for p wave polarization and two liquid crystal cells for s wave polarization is applicable.

In the present disclosure, the diffusion degree of light emitted from the light source 4 is controlled through drive voltage control of the first liquid crystal cell 2 and the second liquid crystal cell 3 in the illumination device 1 having the above-described configuration. The following describes the diffusion degree of light from the illumination device 1, which is a control target in the present disclosure, with reference to FIG. 7.

Figure 7:
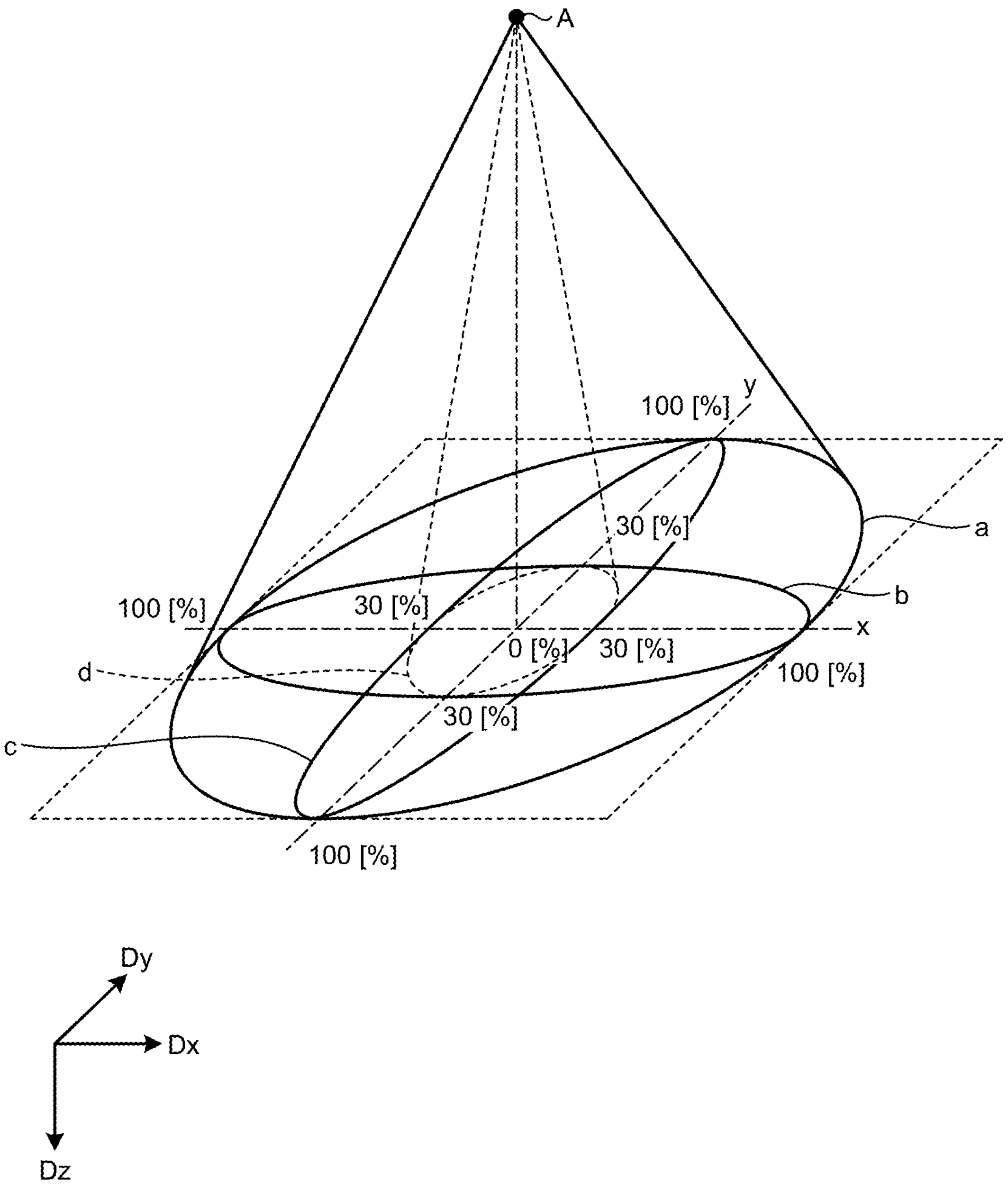
FIG. 7 is a conceptual diagram for conceptually describing the diffusion degree of light from the illumination device according to the embodiment.

FIG. 7 is a conceptual diagram for conceptually describing the diffusion degree of light from the illumination device according to the embodiment. In FIG. 7, the illumination device 1 is regarded as a point light source A, and the irradiation area of light on a virtual plane xy orthogonal to the Dz direction is illustrated. Note that, although FIG. 7 illustrates the example in which the illumination device 1 is regarded as the point light source A, light transmitting through the light modulation region AA of each of the first liquid crystal cell 2 and the second liquid crystal cell 3 is controlled as described above in reality, and thus the illuminance of light decreases around the irradiation area. Furthermore, the outline of the irradiation area is indistinct due to light diffraction phenomenon and the like.

As described above, in each of the first liquid crystal cell 2 and the second liquid crystal cell 3, the orientation direction of the liquid crystal molecules 17 in the liquid crystal layer 8 is controlled by supplying drive voltage to each of the drive electrodes 10 on the first substrate 5 and the drive electrodes 13 on the second substrate 6. Accordingly, the diffusion degree of light emitted from the illumination device 1 can be controlled.

Specifically, for example, the orientation direction of the liquid crystal molecules 17 in the liquid crystal layer 8 of the first liquid crystal cell 2 changes and the diffusion degree in the Dx direction changes in accordance with drive voltage applied to the drive electrodes 10 and 13 of the first liquid crystal cell 2. In the present disclosure, the minimum diffusion degree in the Dx direction is 0[%] and the maximum diffusion degree in the Dx direction is 100[%].

For example, the orientation direction of the liquid crystal molecules 17 in the liquid crystal layer 8 of the second liquid crystal cell 3 changes and the diffusion degree in the Dy direction changes in accordance with drive voltage applied to the drive electrodes 10 and 13 of the second liquid crystal cell 3. In the present disclosure, the minimum diffusion degree in the Dy direction is 0[%] and the maximum diffusion degree in the Dy direction is 100[%].

In FIG. 7, "a" exemplarily illustrates the irradiation area in a case where the diffusion degree in the Dx direction and the diffusion degree in the Dy direction are both 100[%]. In FIG. 7, "b" exemplarily illustrates the irradiation area in a case where the diffusion degree in the Dx direction is 100[%] and the diffusion degree in the Dy direction is 30[%]. In FIG. 7, "c" exemplarily illustrates the irradiation area in a case where the diffusion degree in the Dx direction is 30[%] and the diffusion degree in the Dy direction is 100[%]. In FIG. 7, "d" exemplarily illustrates the irradiation area in a case where the diffusion degree in the Dx direction and the diffusion degree in the Dy direction are both 30[%].

In this manner, the diffusion degree of light in the Dx and Dy directions can be controlled by performing drive voltage control of each of the first liquid crystal cell 2 and the second liquid crystal cell 3 in the illumination device 1 having the above-described configuration. Accordingly, the irradiation area of light from the illumination device 1 can be changed.

Figure 8:
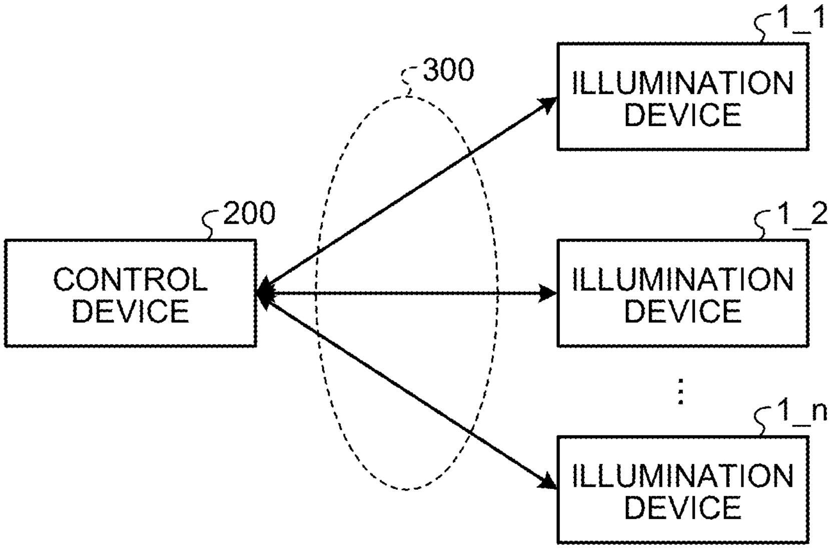
FIG. 8 is a schematic view illustrating an example of the configuration of a light modulation system according to the embodiment.

FIG. 8 is a schematic view illustrating an example of the configuration of a light modulation system according to the embodiment. The light modulation system includes the illumination device 1 and a control device 200. The control device 200 is, for example, a portable communication terminal device such as a smartphone or a tablet.

Data and various command signals are transmitted and received between the illumination device 1 and the control device 200 through a communication means 300. In the present disclosure, the communication means 300 is a wireless communication means such as Bluetooth (registered trademark) or WiFi (registered trademark). Wireless communication may be performed between the illumination device 1 and the control device 200 through a predetermined network such as a mobile communication network.

Alternatively, the illumination device 1 and the control device 200 may be coupled to each other in a wired manner to perform wired communication therebetween. Note that FIG. 8 exemplarily illustrates an aspect in which the control device 200 controls the diffusion degrees of illumination devices 1_1, 1_2, . . . , 1-*n*, but the present disclosure is not limited by the number of illumination devices 1 to be controlled by the control device 200.

Figure 9:
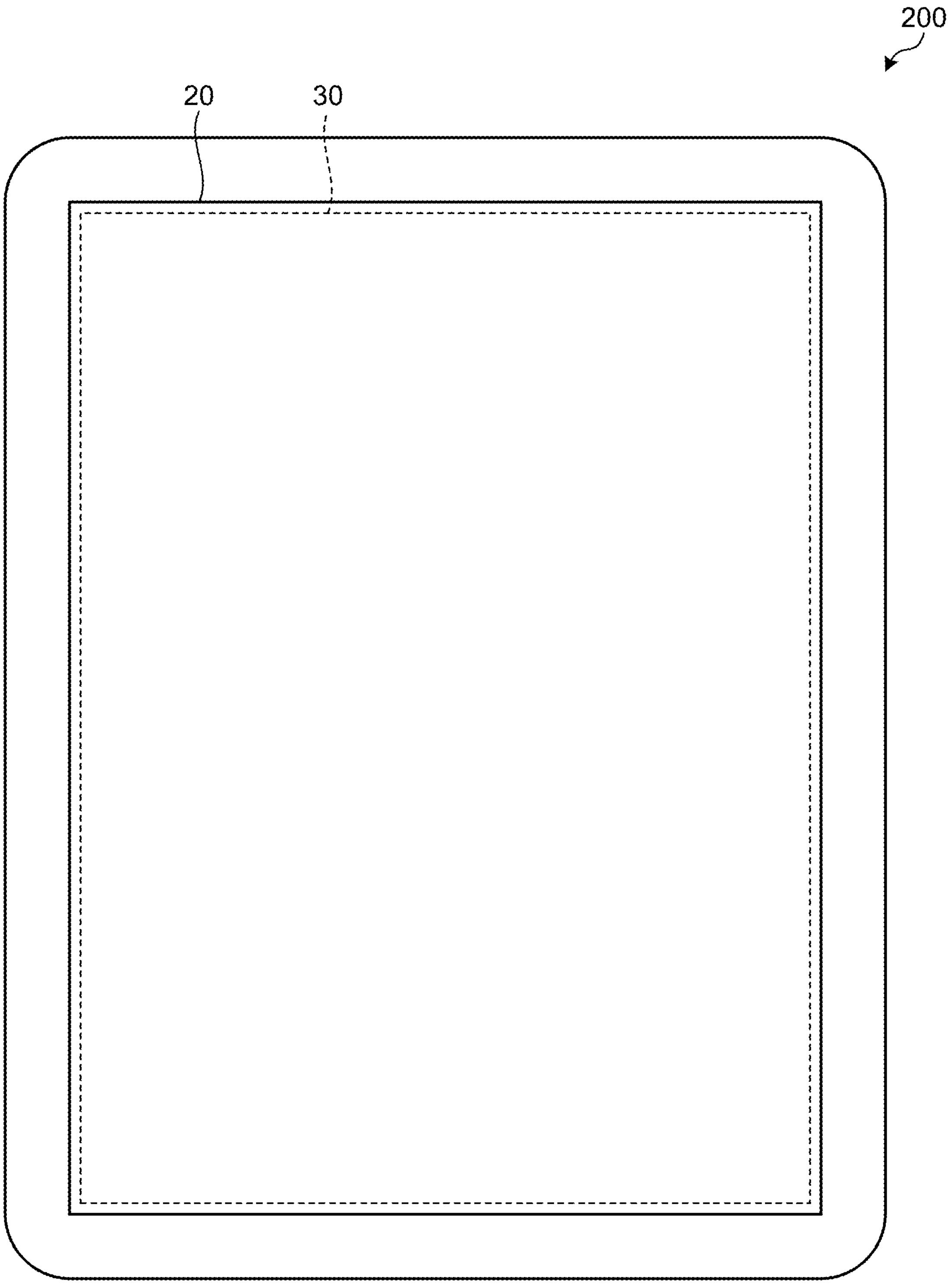
FIG. 9 is an exterior diagram illustrating an example of a control device according to the embodiment.

FIG. 9 is an exterior diagram illustrating an example of the control device according to the embodiment. The control device 200 is a display device equipped with a touch detection function, in which a display panel 20 and a touch sensor 30 are integrated. Specifically, the display panel 20 is what is called an in-cell type or hybrid type device in which the touch sensor 30 is built and integrated. The configuration in which the touch sensor 30 is built and integrated in the display panel 20 includes, for example, a configuration in which some members such as substrates and electrodes used as the display panel 20 and some members such as substrates and electrodes used as the touch sensor 30 are shared. Note that the display panel 20 may be what is called an on-cell type device in which the touch sensor 30 is mounted on a display device.

The display panel 20 is, for example, a liquid crystal display panel including a liquid crystal display element. The display panel 20 is not limited thereto but may be, for example, an organic EL display panel (OLED: organic light emitting diode) or an inorganic EL display panel (micro LED or mini LED).

The touch sensor 30 is, for example, a capacitive touch sensor. The touch sensor 30 is not limited thereto but may be, for example, a touch sensor of a resistance film scheme or a touch sensor of an ultrasonic wave scheme or an optical scheme.

Figure 10:
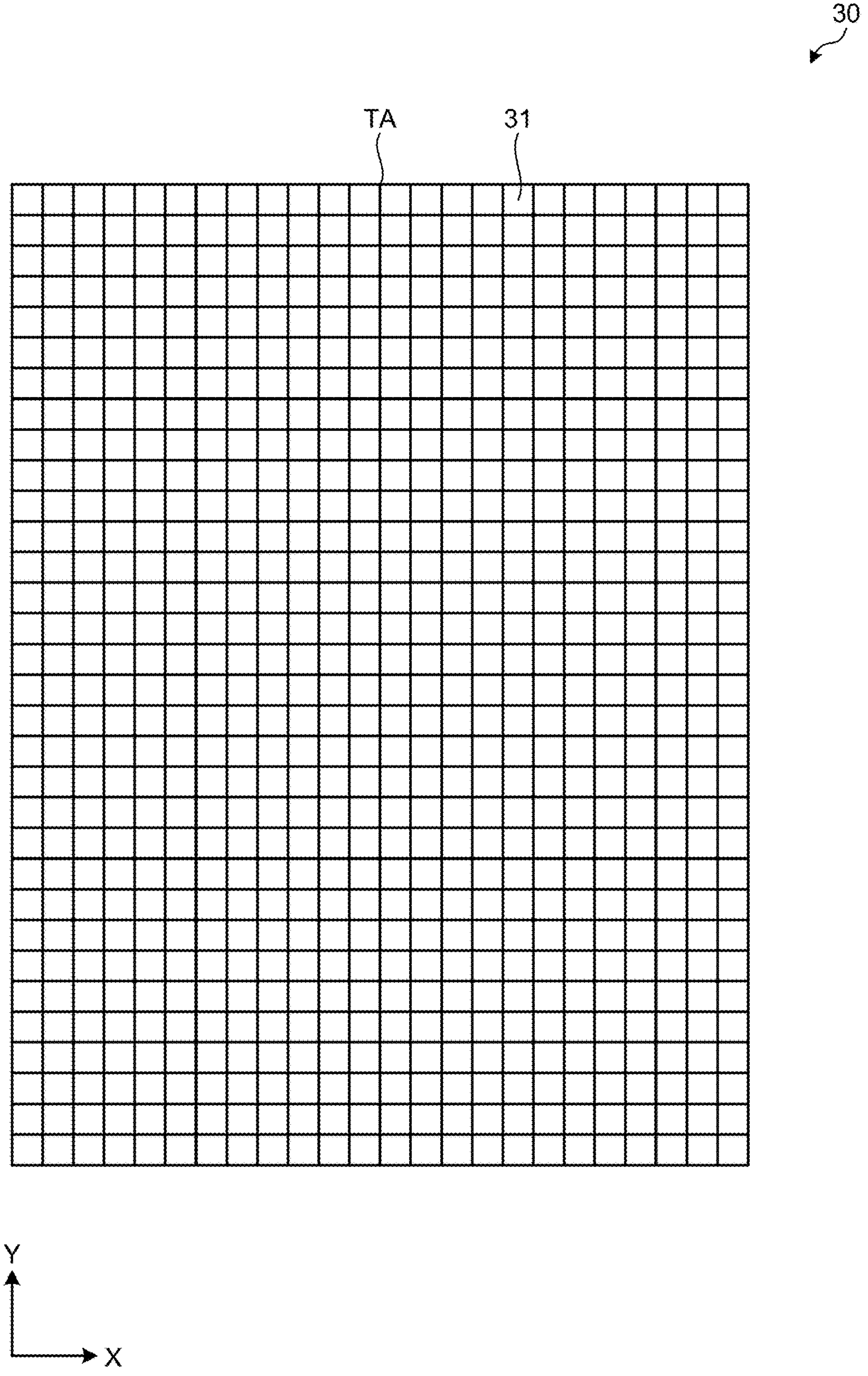
FIG. 10 is a conceptual diagram illustrating an example of a touch detection region of a touch sensor.

FIG. 10 is a conceptual diagram illustrating an example of a touch detection region of the touch sensor. A plurality of detection elements 31 are provided in a detection region FA of the touch sensor 30. In the detection region FA of the touch sensor 30, the detection elements 31 are arranged in an X direction (first direction) and a Y direction (second direction) orthogonal to the X direction and provided in a matrix of rows and columns. In other words, the touch sensor 30 includes the detection region FA overlapping the detection elements 31 arranged in the X direction (first direction) and the Y direction (second direction).

Figure 11:
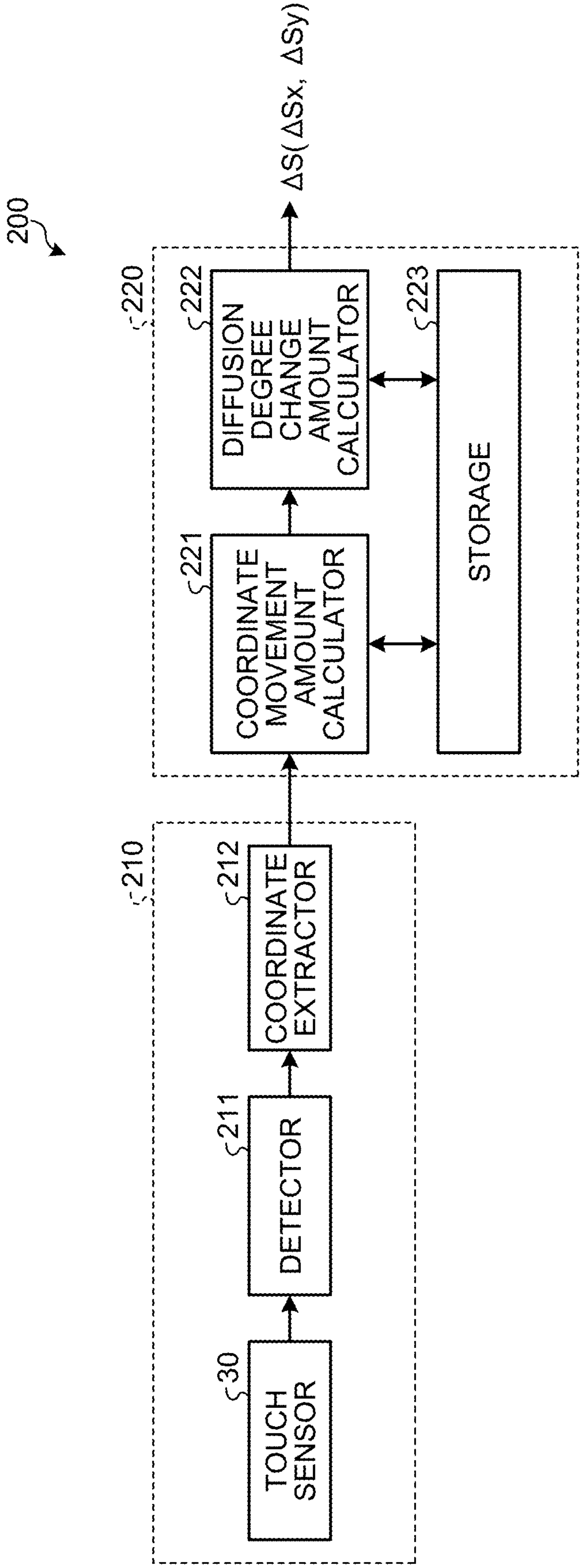
FIG. 11 is a diagram illustrating an example of a control block configuration that controls the diffusion degree of each illumination device in the control device according to the embodiment.

FIG. 11 is a diagram illustrating an example of a control block configuration that controls the diffusion degree of each illumination device in the control device according to the embodiment.

As illustrated in FIG. 11, the control device 200 according to the embodiment includes a detection device 210 and a processing device 220. The detection device 210 includes the touch sensor 30, a detector 211, and a coordinate extractor 212. The processing device 220 includes a coordinate movement amount calculator 221, a diffusion degree change amount calculator 222, and a storage 223. The detector 211 and the coordinate extractor 212 of the detection device 210 are each constituted by, for example, a detection IC. The processing device 220 includes, for example, a central processing unit (CPU), a random access memory (RAM), an electrically erasable programmable read only memory (EEPROM), and a read only memory (ROM) of the smartphone, the tablet, or the like as the control device 200.

The detector 211 is a circuit configured to detect existence of a touch on the touch sensor 30 based on a detection signal output from each detection element 31 of the touch sensor 30.

The coordinate extractor 212 is a logic circuit configured to calculate the coordinate of a touch detection position when a touch is detected by the detector 211.

The coordinate movement amount calculator 221 calculates the movement amount of the touch detection position extracted by the coordinate extractor 212. The coordinate movement amount calculator 221 is a component implemented by, for example, the CPU of the smartphone, the tablet, or the like as the control device 200.

The diffusion degree change amount calculator 222 calculates a diffusion degree change amount for the illumination device 1 as a control target based on the movement amount of the touch detection position calculated by the coordinate movement amount calculator 221. The diffusion degree change amount calculator 222 is a component implemented by, for example, the CPU of the smartphone, the tablet, or the like as the control device 200.

The storage 223 is constituted by, for example, the RAM, EEPROM, or ROM of the smartphone, the tablet, or the like as the control device 200. In the present disclosure, the storage 223 stores, for example, the coordinate of the touch detection position extracted by the coordinate extractor 212.

First Embodiment

Figure 12:
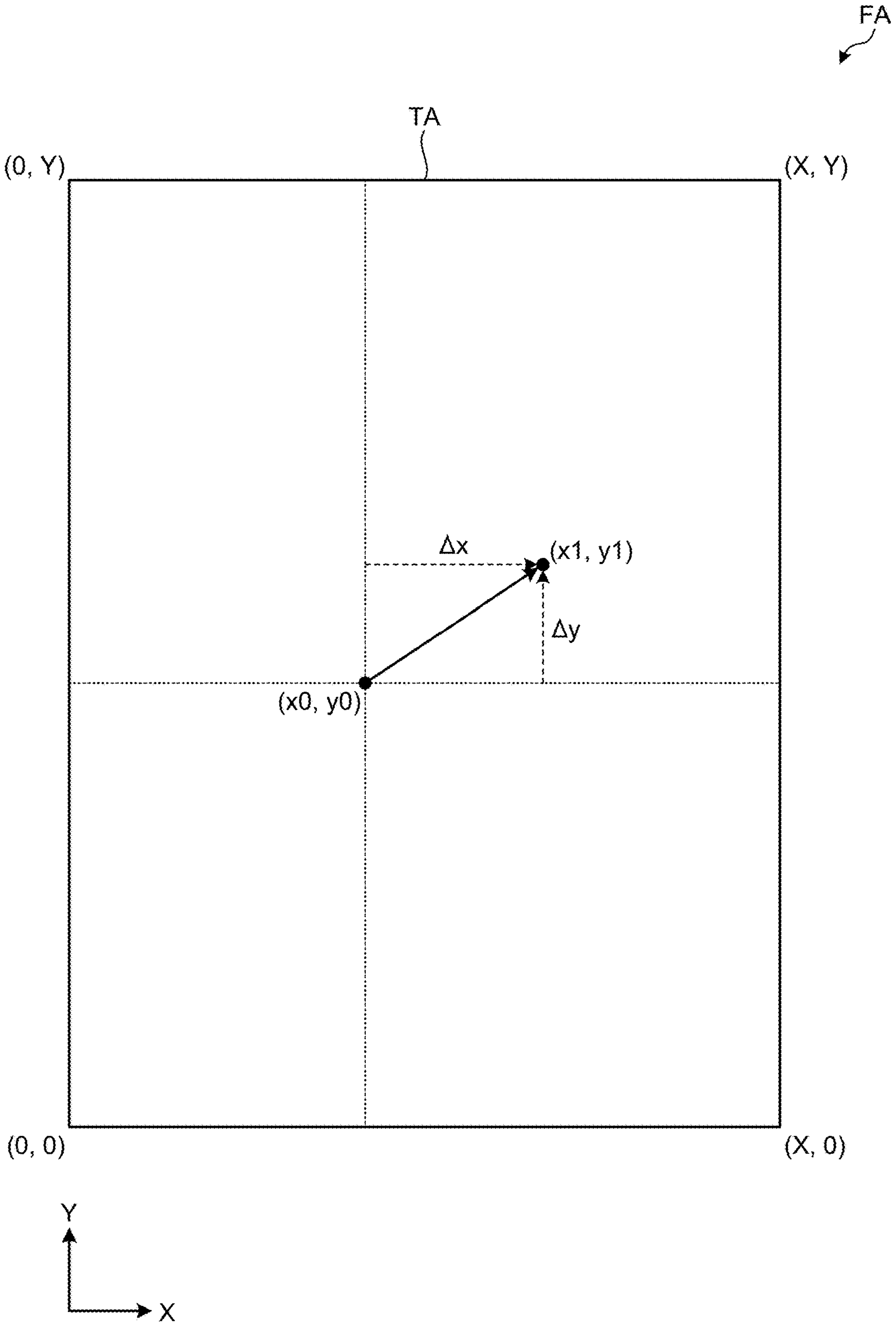
FIG. 12 is a conceptual diagram of a diffusion degree control method in a first embodiment.

A method of controlling the diffusion degree of light from the illumination device 1 in the above-described configuration according to the embodiment will be described below. FIG. 12 is a conceptual diagram of the diffusion degree control method in a first embodiment.

As illustrated in FIG. 12, a diffusion degree adjustment region TA is provided in the detection region FA of the touch sensor 30. The horizontal axis of the diffusion degree adjustment region TA represents a coordinate axis in the X direction (first direction) and corresponds to the Dx direction of the illumination device 1. The vertical axis of the diffusion degree adjustment region TA represents a coordinate axis in the Y direction (second direction) and corresponds to the Dy direction of the illumination device 1. The diffusion degree adjustment region TA only needs to be provided in the detection region FA of the touch sensor 30 and may be the entire detection region FA.

In the present disclosure, the diffusion degree of light from the illumination device 1 is changed in accordance with the movement amount of the touch detection position in the diffusion degree adjustment region TA of the touch sensor 30. Specifically, a diffusion degree change amount ΔSx in the Dx direction and a diffusion degree change amount ΔSy in the Dy direction in the illumination device 1 when the coordinate of the touch detection position moves from (x0, y0) to (x1, y1) are given by Expressions (1) and (2) below, respectively, where Sxmax is the maximum value of the diffusion degree in the Dx direction and Symax is the maximum value of the diffusion degree in the Dy direction in the illumination device 1.

$$\Delta Sx = Sx\max / X \times (x1 - x0) = Sx\max / X \times \Delta x \quad (1)$$

$$\Delta Sy = Sy\max / Y \times (y1 - y0) = Sy\max / Y \times \Delta y \quad (2)$$

With Expressions (1) and (2) above, for example, a diffusion degree change amount ΔSxmax in the Dx direction and a diffusion degree change amount ΔSymax in the Dy direction in the illumination device 1 when the coordinate of the touch detection position moves from (0, 0) to (X, Y) can be expressed by Expressions (3) and (4) below, respectively.

$$\Delta Sx\max = Sx\max \quad (3)$$

$$\Delta Sy\max = Sy\max \quad (4)$$

Figure 13:
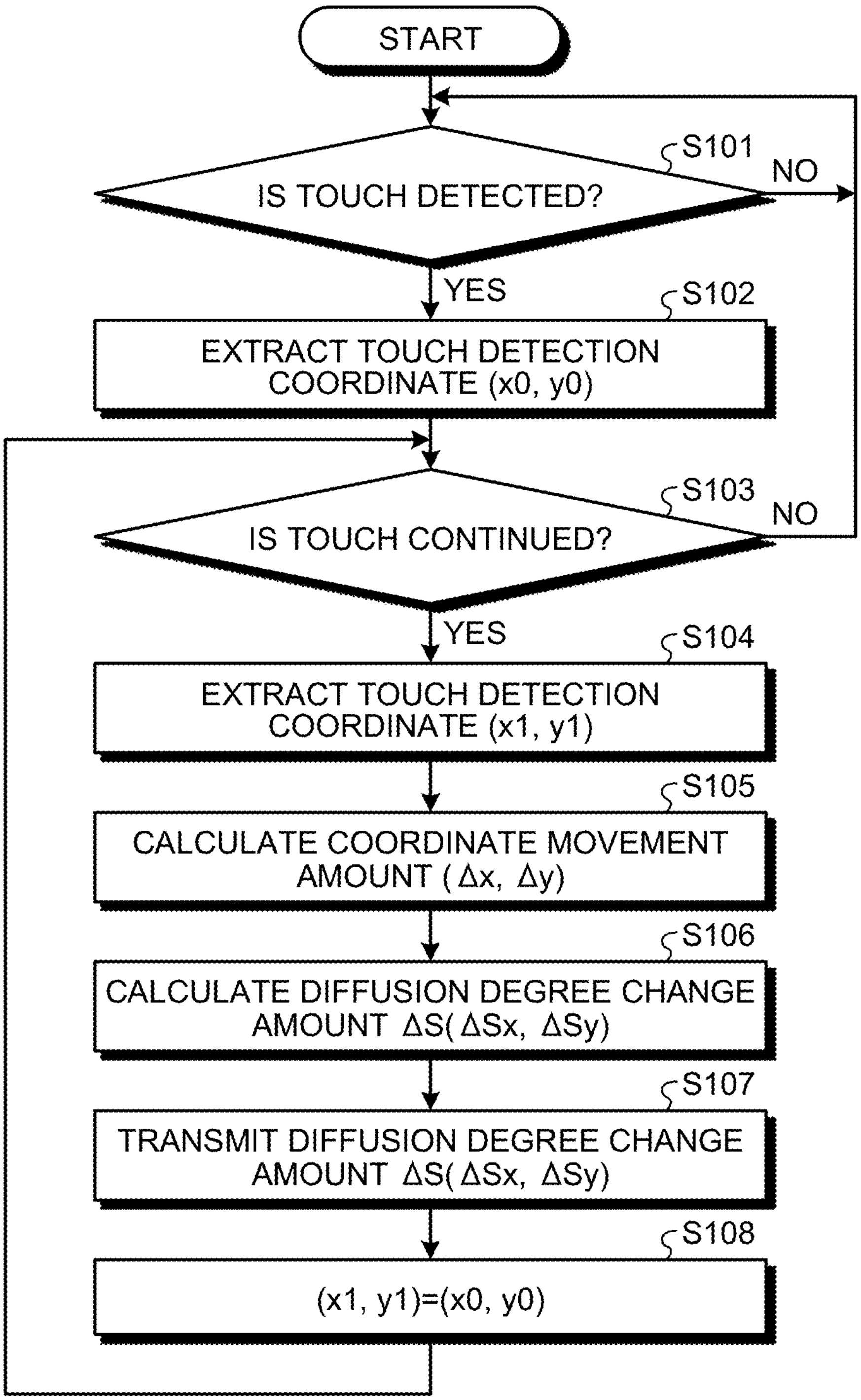
FIG. 13 is a flowchart illustrating an example of diffusion degree control processing at a control device according to the first embodiment.
Figure 14:
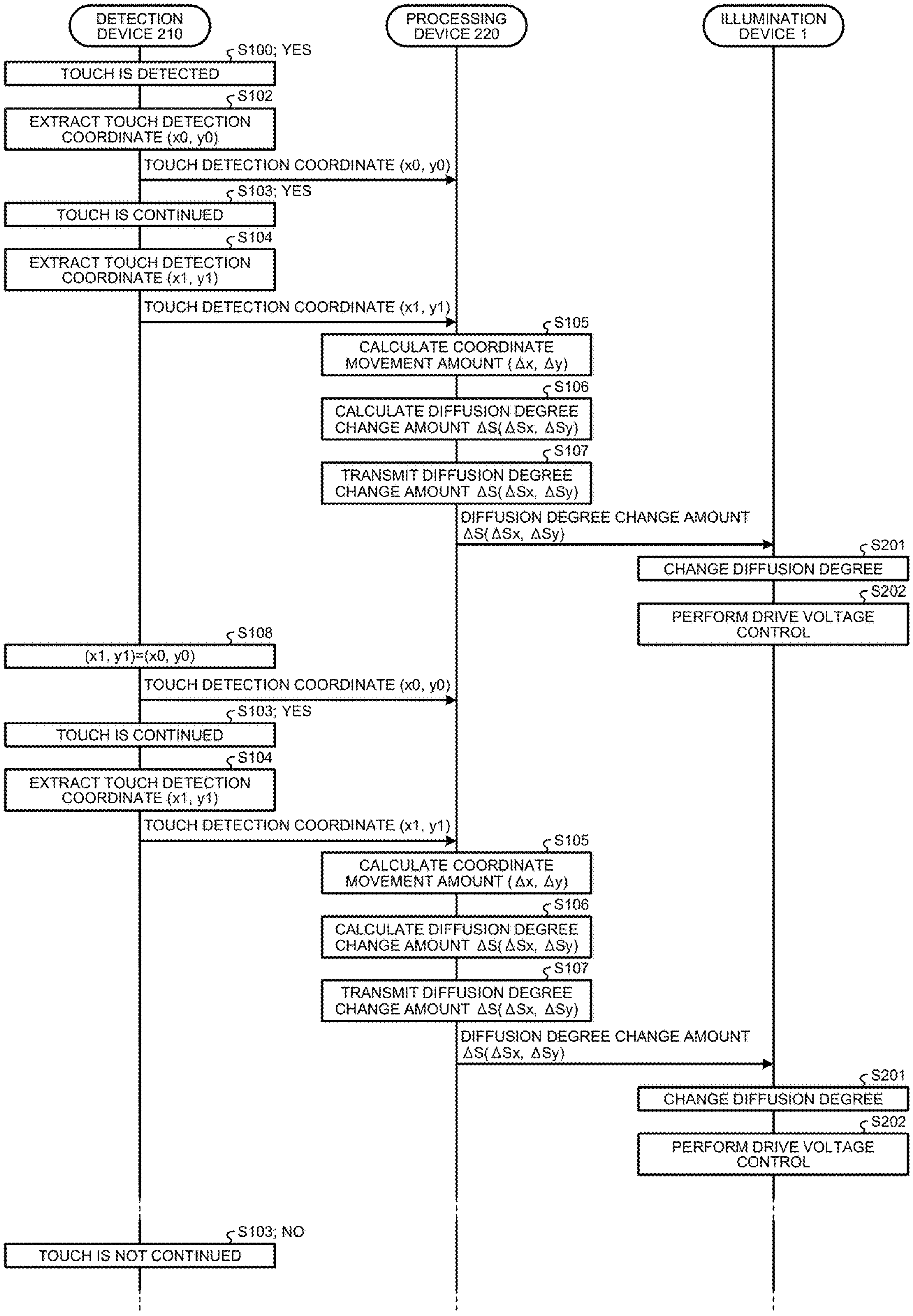
FIG. 14 is a sequence diagram illustrating a specific example of the diffusion degree control processing on an illumination device in a light modulation system according to the first embodiment.

FIG. 13 is a flowchart illustrating an example of diffusion degree control processing at the control device according to the first embodiment. FIG. 14 is a sequence diagram illustrating a specific example of the diffusion degree control processing on an illumination device in the light modulation system according to the first embodiment.

The following first describes a case where a single illumination device 1 is to be controlled by the control device 200.

The detector 211 detects existence of a touch in the diffusion degree adjustment region TA of the touch sensor 30 (step S101). In a case where a touch is detected in the diffusion degree adjustment region TA (Yes at step S101), the coordinate extractor 212 extracts the coordinate (x0, y0) of the touch detection position (step S102).

The detector 211 detects whether the touch is continued in the diffusion degree adjustment region TA of the touch sensor 30 (step S103).

In a case where no touch is detected at step S101 (No at step S101) or in a case where the touch is not continued at step S103 (No at step S103), the process returns to the processing at step S101 to repeatedly execute the same processing.

In a case where the touch in the diffusion degree adjustment region TA of the touch sensor 30 is continued (Yes at step S103), the coordinate extractor 212 extracts the coordinate (x1, y1) of the touch detection position (step S104).

The coordinate movement amount calculator 221 calculates the movement amount of the touch detection position (step S105). Specifically, the coordinate movement amount calculator 221 calculates the movement amount Δx in the X direction (first direction) and the movement amount Δy in the Y direction (second direction) when the coordinate of the touch detection position extracted by the coordinate extractor 212 moves from (x0, y0) to (x1, y1).

Note that the coordinate (x0, y0) of the touch detection position extracted at step S102 may be stored in the storage 223 (for example, the RAM included in the processing device 220). In this case, the coordinate movement amount calculator 221 reads the coordinate (x0, y0) stored in the storage 223 and calculates the movement amount (Δx, Δy) from the coordinate (x0, y0) to the coordinate (x1, y1) of the touch detection position extracted at step S104.

The diffusion degree change amount calculator 222 calculates, based on the movement amount (Δx, Δy) calculated by the coordinate movement amount calculator 221, a diffusion degree change amount ΔS(ΔSx, ΔSy) for the illumination device 1 to be controlled (step S106). Specifically, the diffusion degree change amount calculator 222 calculates the diffusion degree change amount ΔS(ΔSx, ΔSy) by using Expressions (1) and (2) above.

The control device 200 transmits the diffusion degree change amount ΔS(ΔSx, ΔSy) to the illumination device 1 through the communication means 300 (step S107).

The control device 200 sets the coordinate (x1, y1) of the touch detection position extracted at step S104 to (x0, y0) (step S108) and returns to step S103 to repeatedly execute the same processing.

Note that, after the setting to (x0, y0) at step S108, the coordinate of the touch detection position may be stored in the storage 223 (for example, the RAM included in the processing device 220). In this case, the coordinate movement amount calculator 221 reads the coordinate (x0, y0) stored in the storage 223 and calculates the movement amount (Δx, Δy) from the coordinate (x0, y0) to the coordinate (x1, y1) of the touch detection position extracted at step S104 in the following processing.

The illumination device 1 changes the diffusion degree of light in the Dx and Dy directions in accordance with the diffusion degree change amount ΔS(ΔSx, ΔSy) transmitted from the control device 200 (step S201) and performs drive voltage control of the drive electrodes 10 and 13 of the first liquid crystal cell 2 and the second liquid crystal cell 3 (step S202).

The above-described processing is repeatedly executed while the touch is continued at step S103, and in a case where the touch is no longer continued (No at step S103), the process returns to the processing at step S101 and repeatedly executes the processing at step S101 until a touch is detected in the diffusion degree adjustment region TA of the touch sensor 30 (Yes at step S101).

Through the diffusion degree control processing described above, the irradiation area of light from the illumination device 1 can be changed by using the control device 200 exemplified by a portable communication terminal device such as a smartphone or a tablet.

Figure 15:
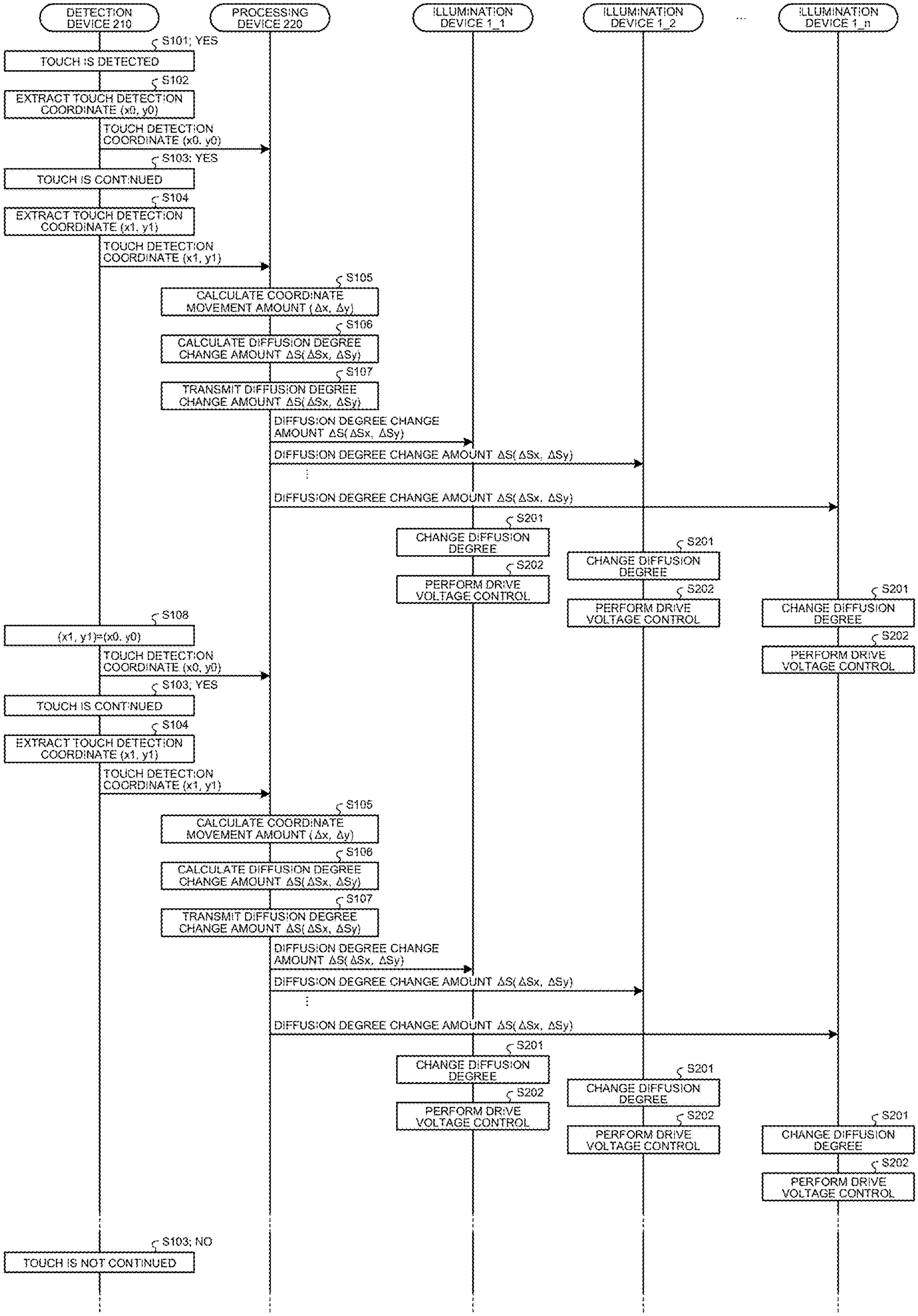
FIG. 15 is a sequence diagram illustrating a first modification of the diffusion degree control processing on each illumination device in the light modulation system according to the first embodiment.

FIG. 15 is a sequence diagram illustrating a first modification of the diffusion degree control processing on each illumination device in the light modulation system according to the first embodiment. Description of FIG. 15 corresponds to a case where the illumination devices 1_1, 1_2, . . . , 1_*n* are to be controlled by the control device 200.

In a case where the illumination devices 1_1, 1_2, . . . , 1_*n* are to be controlled by the control device 200, the control device 200 sequentially transmits the diffusion degree change amount ΔS(ΔSx, ΔSy) to the illumination devices 1_1, 1_2, . . . , 1_*n* at step S107.

Accordingly, the irradiation areas of light from the illumination devices 1_1, 1_2, . . . , **1_*n* can be changed by using the control device 200** exemplified by a portable communication terminal device such as a smartphone or a tablet.

Figure 16:
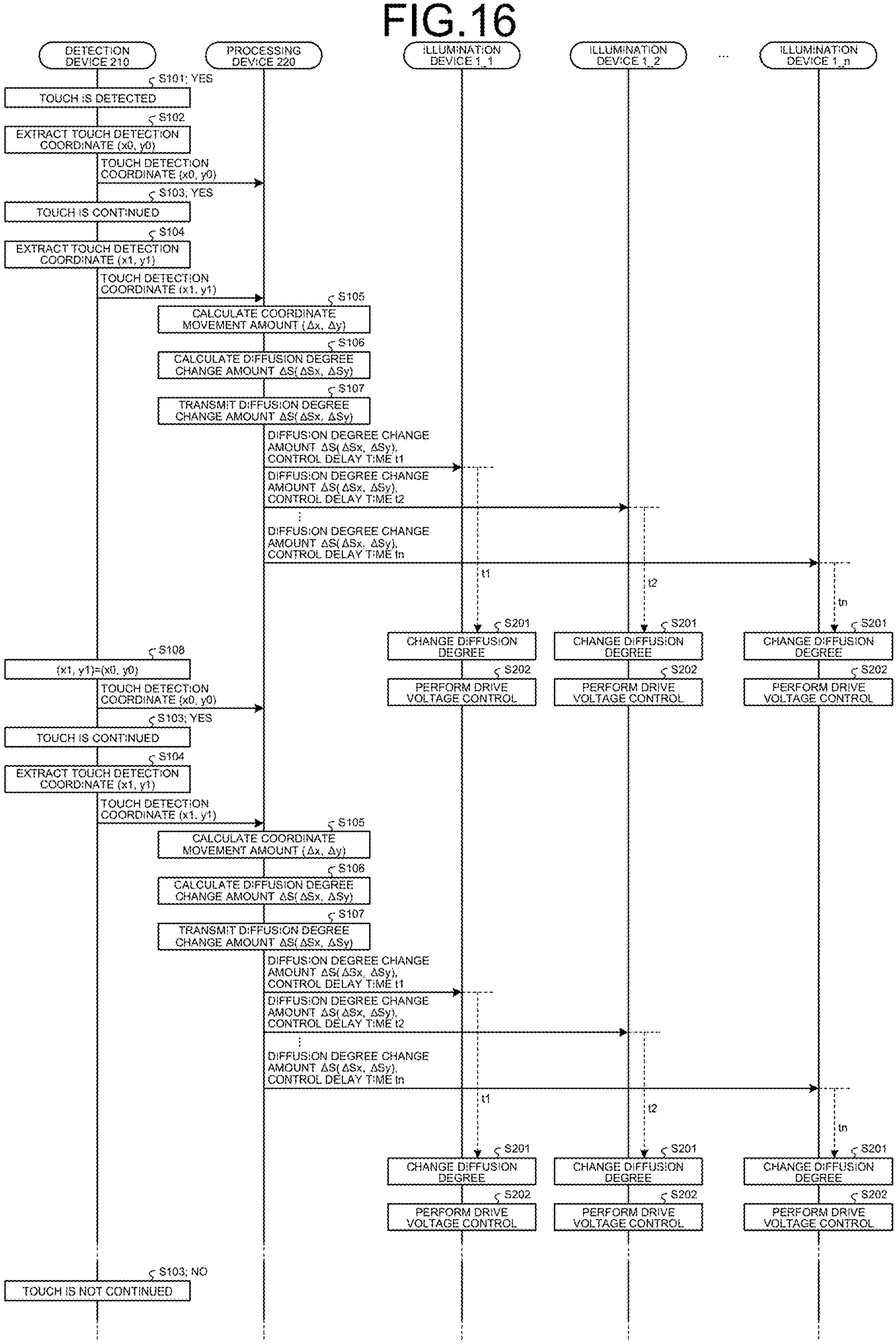
FIG. 16 is a sequence diagram illustrating a second modification of the diffusion degree control processing on each illumination device in the light modulation system according to the first embodiment.

FIG. 16 is a sequence diagram illustrating a second modification of the diffusion degree control processing on each illumination device in the light modulation system according to the first embodiment.

In the first modification illustrated in FIG. 15, when the diffusion degree change amount ΔS(ΔSx, ΔSy) is sequentially transmitted to the illumination devices 1_1, 1_2, . . . , **1_*n* at step S107, a time lag sometimes occurs among the execution timings of drive voltage control at the illumination devices 1_1, 1_2, . . . , 1_*n* due to difference among the timings of transmission to the illumination devices 1_1, 1_2, . . . , 1_*n*. Specifically, for example, in a case where the communication means 300 is Bluetooth (registered trademark), pairing establishment and cancellation need to be sequentially performed between the control device 200 and each of the illumination devices 1_1, 1_2, . . . , 1_*n*. Accordingly, a time lag until pairing establishment is large, and time lags having occurred among the execution timings of drive voltage control at the illumination devices 1_1, 1_2, . . . , 1_*n*** are felt in some cases.

In the second modification illustrated in FIG. 16, when the diffusion degree change amount ΔS(ΔSx, ΔSy) is transmitted from the control device 200 to each of the illumination devices 1_1, 1_2, . . . , **1_*n*, different control delay times t1, t2, . . . , tn are set to the illumination devices 1_1, 1_2, . . . , 1_*n*, respectively, and transmitted together with the diffusion degree change amount ΔS(ΔSx, ΔSy) so that drive voltage control is simultaneously executed at the illumination devices 1_1, 1_2, . . . , 1_*n*. Accordingly, drive voltage control can be simultaneously executed at the illumination devices 1_1, 1_2, . . . , 1_*n***.

Note that the present disclosure is not limited to the aspects illustrated in FIGS. 15 and 16 but may include, for example, an aspect in which the diffusion degree change amount ΔS(ΔSx, ΔSy) is simultaneously distributed to the illumination devices 1_1, 1_2, . . . , **1_*n* by the communication means 300. In this case, drive voltage control is simultaneously executed at the illumination devices 1_1, 1_2, . . . , 1_*n* without setting the control delay times t1, t2**, . . . , tn.

Figure 17:
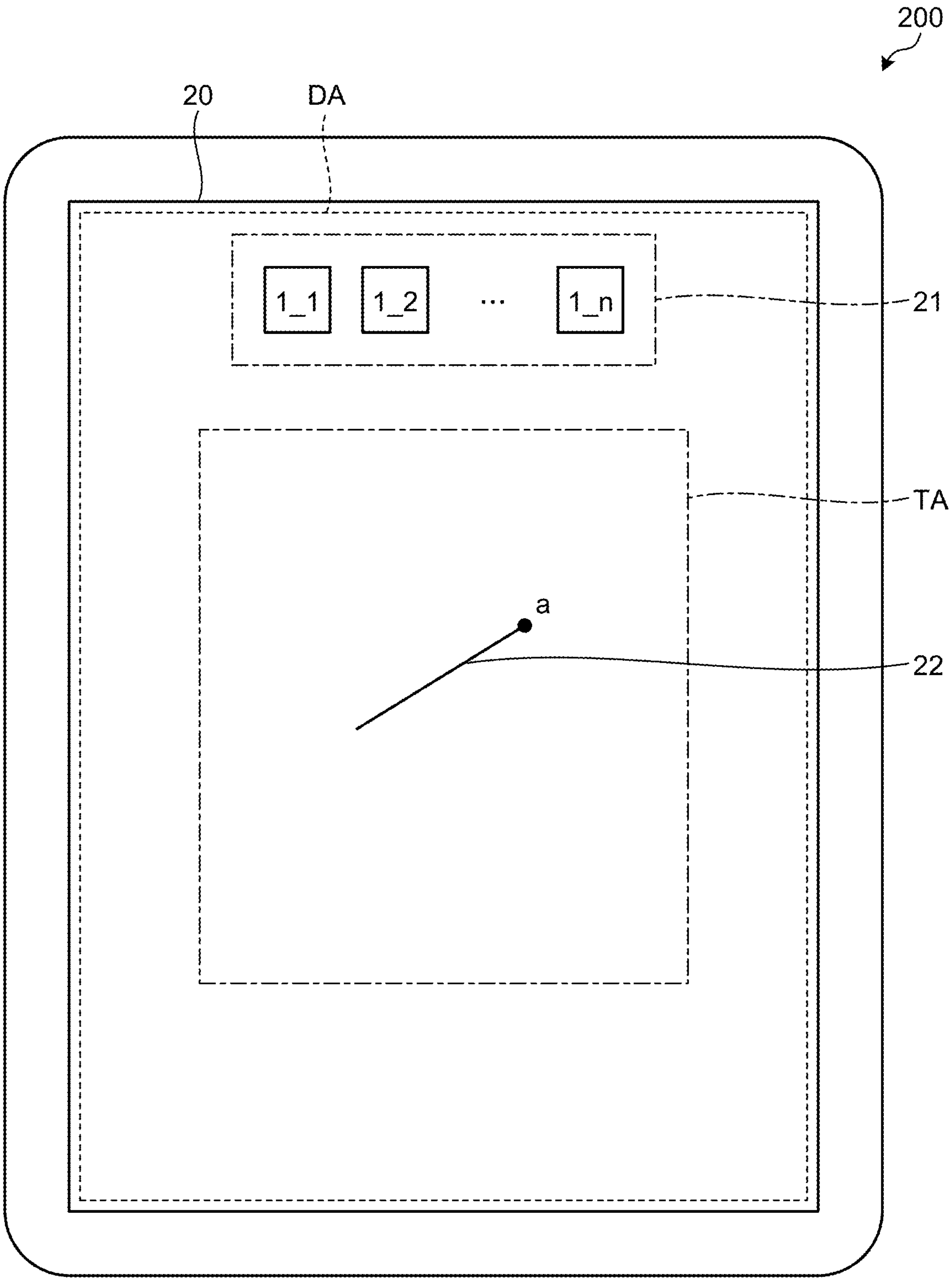
FIG. 17 is a conceptual diagram illustrating an exemplary display aspect on a display panel according to the first embodiment.

FIG. 17 is a conceptual diagram illustrating an exemplary display aspect on the display panel according to the first embodiment.

A display region DA that overlaps the detection region FA of the touch sensor 30 illustrated in FIG. 9 in a plan view is provided on the display panel 20 of the control device 200. In an example illustrated in FIG. 17, the diffusion degree adjustment region TA is provided at the center of the display region DA overlapping the detection region FA.

As illustrated in FIG. 17, for example, control target selection icons 21 for selecting an illumination device 1 to be controlled by the control device 200 from among the illumination devices 1_1, 1_2, . . . , **1_*n* may be provided in a region (in the example illustrated in FIG. 17**, a region on the upper side of the diffusion degree adjustment region TA) outside the diffusion degree adjustment region TA in the display region DA.

As illustrated in FIG. 17, a locus 22 of a touch detection position “a” in the diffusion degree adjustment region TA may be displayed. The locus 22 of the touch detection position “a” in the diffusion degree adjustment region TA is displayed while a touch is continued in the diffusion degree adjustment region TA (Yes at step S103) since the touch is detected at step S101 of the above-described diffusion degree control processing (Yes at step S101). Alternatively, the locus 22 may be displayed until a predetermined time elapses since no touch continuation is detected at step S103 (No at step S103).

Second Embodiment

Figure 18:
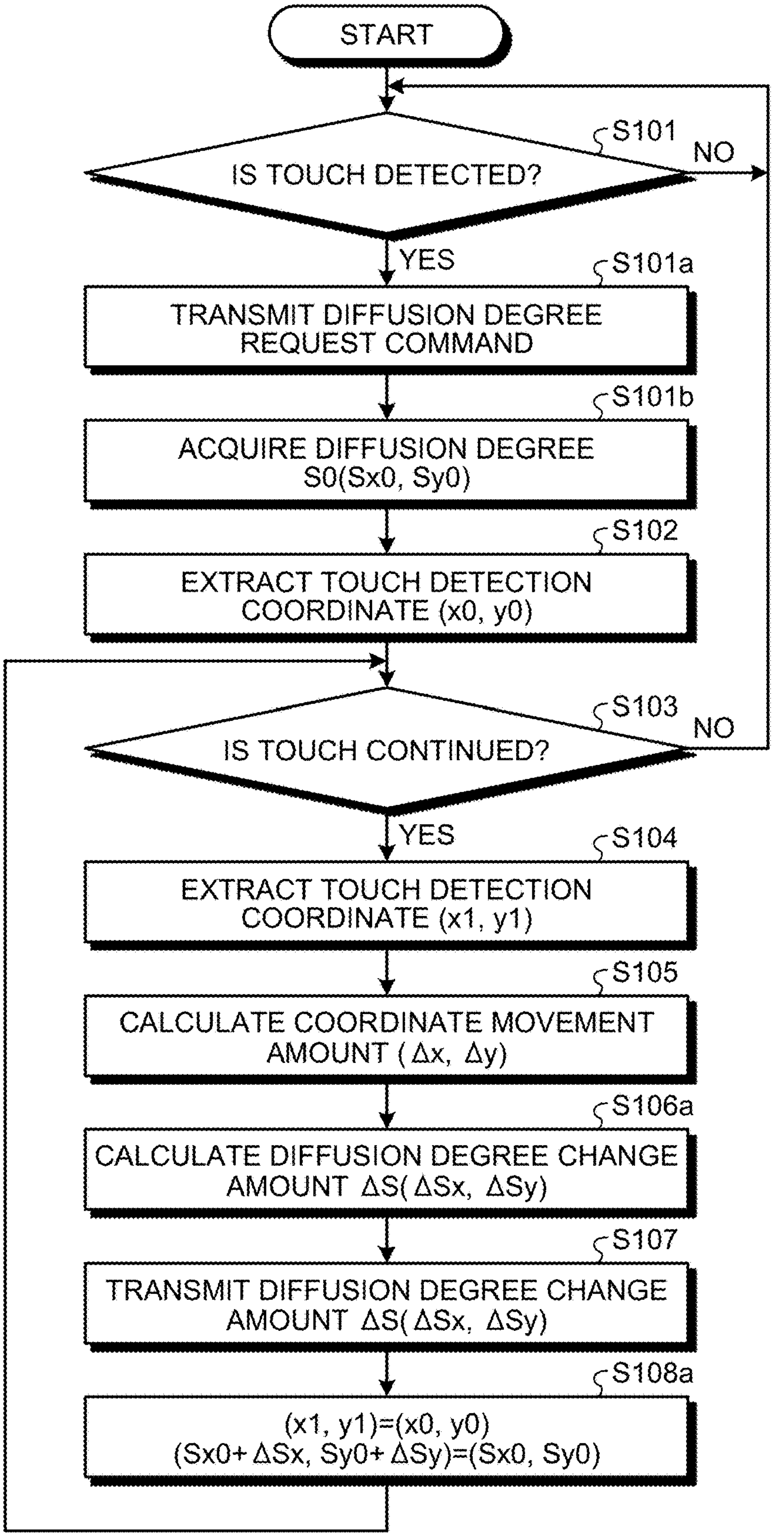
FIG. 18 is a flowchart illustrating an example of the diffusion degree control processing at the control device according to a second embodiment.
Figure 19:
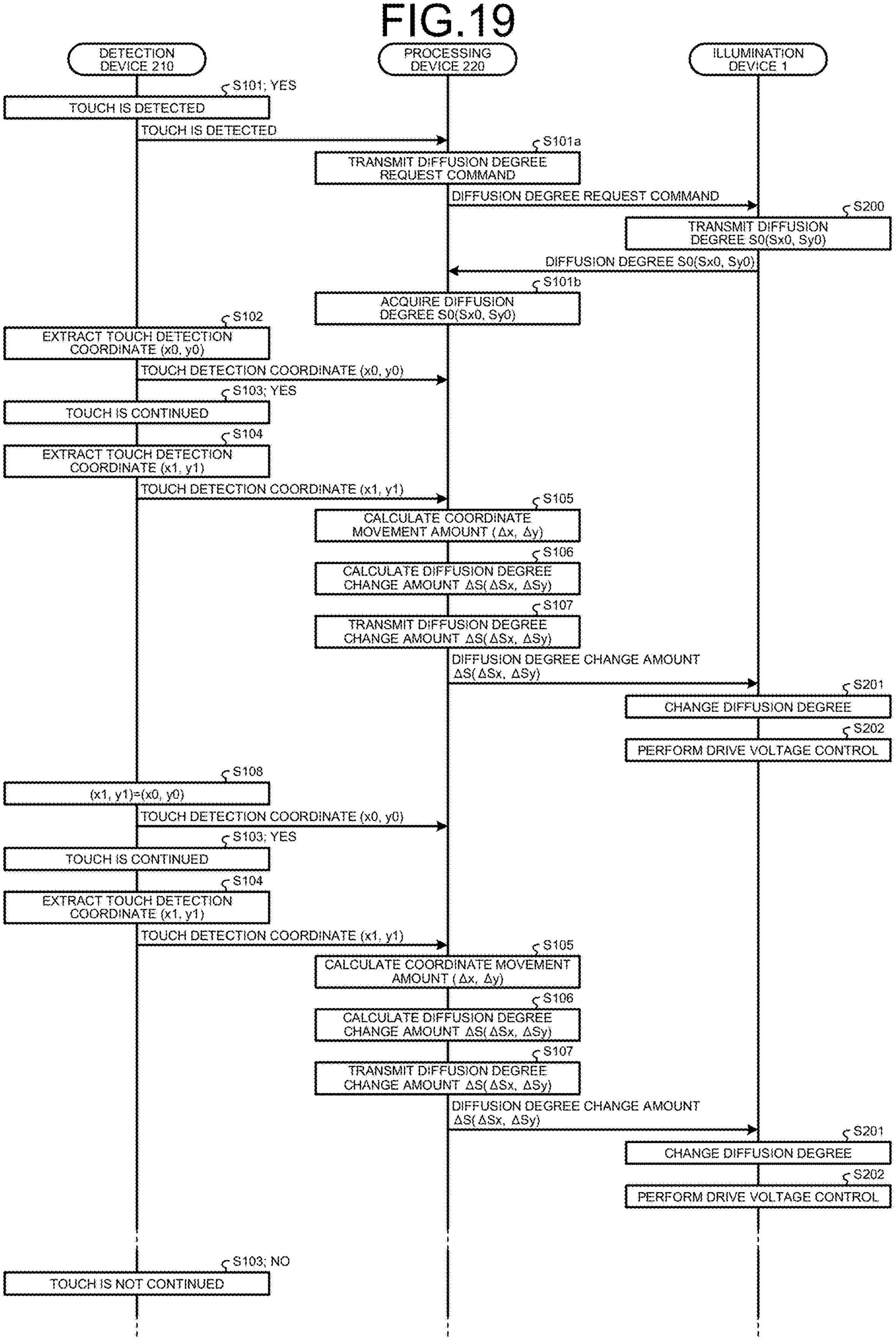
FIG. 19 is a sequence diagram illustrating a specific example of the diffusion degree control processing on each illumination device in a light modulation system according to the second embodiment.

In a second embodiment, the method of diffusion degree change amount calculation is different from that in the above-described first embodiment. FIG. 18 is a flowchart illustrating an example of the diffusion degree control processing at the control device according to the second embodiment. FIG. 19 is a sequence diagram illustrating a specific example of the diffusion degree control processing on each illumination device in the light modulation system according to the second embodiment. Note that, in the following description, the same constituent component or processing as described above in the first embodiment is denoted by the same reference sign and duplicate description thereof is omitted, whereas any difference from the first embodiment will be described below.

In a case where a touch is detected in the diffusion degree adjustment region TA by the detector 211 (Yes at step S101), the processing device 220 transmits a diffusion degree request command to the illumination device 1 through the communication means 300 (step S101*a*). The illumination device 1 transmits the current diffusion degree S0(Sx0, Sy0) to the control device 200 through the communication means 300 in accordance with the diffusion degree request command from the control device 200 (step S200). The control device 200 acquires the current diffusion degree S0(Sx0, Sy0) transmitted from the illumination device 1 through the communication means 300 (step S101*b*).

In the present embodiment, the diffusion degree change amount calculator 222 calculates the diffusion degree change amount ΔS(ΔSx, ΔSy) by using Expressions (5), (6), (7), and (8) below (step S106*a*).

$$\Delta Sx = (Sx\max - Sx0)/(X - x0)\times(x1 - x0) = (Sx\max - Sx0)/(X - x0)\times\Delta x \text{ (where } \Delta x\,(=x1-x0)\ge 0) \tag{5}$$

$$\Delta Sx = Sx0/x0\times(x1 - x0) = Sx0/x0\times\Delta x \text{ (where } \Delta x\,(=x1-x0)< 0) \tag{6}$$

$$\Delta Sy = (Sy\max - Sy0)/(Y - y0)\times(y1 - y0) = (Sy\max - Sy0)/(Y - y0)\times\Delta y \text{ (where } \Delta y\,(=y1-y0)\ge 0) \tag{7}$$

$$\Delta Sy = Sy0/y0\times(y1 - y0) = Sy0/y0\times\Delta y \text{ (where } \Delta y\,(=y1-y0)< 0) \tag{8}$$

For example, with Expressions (5) and (7) above, the diffusion degree change amount ΔSx in the Dx direction and the diffusion degree change amount ΔSy in the Dy direction in the illumination device 1 when the coordinate of the touch detection position extracted at step S104 is (X, Y), in other words, the coordinate of the touch detection position moves from (x0, y0) to (X, Y) can be expressed by Expressions (9) and (10) below, respectively.

$$\Delta Sx = (Sx\max - Sx0)/(X - x0)\times(X - x0) = Sx\max - Sx0 \tag{9}$$

$$\Delta Sy = (Sy\max - Sy0)/(Y - y0)\times(Y - y0) = Sy\max - Sy0 \tag{10}$$

For example, with Expressions (6) and (8) above, the diffusion degree change amount ΔSx in the Dx direction and the diffusion degree change amount ΔSy in the Dy direction in the illumination device 1 when the coordinate of the touch detection position extracted at step S104 is (0, 0), in other words, the coordinate of the touch detection position moves from (x0, y0) to (0, 0) can be expressed by Expressions (11) and (12) below, respectively.

$$\Delta Sx = Sx0/x0 \times (0 - x0) = -Sx0 \tag{11}$$

$$\Delta Sy = Sy0/y0 \times (0 - y0) = -Sy0 \tag{12}$$

Accordingly, irrespective of the touch detection position (coordinate (x0, y0)) extracted at step S102, the diffusion degree Sx in the Dx direction at the illumination device 1 is can be adjusted in the whole area of 0≤Sx≤Sxmax in the entire diffusion degree adjustment region TA in the x direction (first direction). In addition, the diffusion degree Sy in the Dy direction at the illumination device 1 can be adjusted in the whole area of 0≤Sy≤Symax in the entire diffusion degree adjustment region TA the y direction (second direction).

Note that the current diffusion degree S0(Sx0, Sy0) acquired from the illumination device 1 at step S101*a* may be stored in the storage 223 (for example, the RAM included in the processing device 220). In this case, the diffusion degree change amount calculator 222 reads the current diffusion degree S0(Sx0, Sy0) stored in the storage 223 and calculates the diffusion degree change amount ΔS(ΔSx, ΔSy) by using Expressions (5), (6), (7), and (8) above.

Then, the control device 200 sets the coordinate (x1, y1) of the touch detection position extracted at step S104 to (x0, y0) and adds the diffusion degree change amount ΔS(ΔSx, ΔSy) calculated at step S106 to the diffusion degree S0(Sx0, Sy0) acquired from the illumination device 1 to set the current diffusion degree S0(Sx0, Sy0) (step S108*a*), and returns to step S103 to repeatedly execute the same processing.

Note that, after the setting to (x0, y0) and the setting to S0(Sx0, Sy0) at step S108*a*, the coordinate of the touch detection position and the current diffusion degree may be stored in the storage 223 (for example, the RAM included in the processing device 220). In this case, the coordinate movement amount calculator 221 reads the coordinate (x0, y0) stored in the storage 223 and calculates the movement amount (Δx, Δy) from the coordinate (x0, y0) to the coordinate (x1, y1) of the touch detection position extracted at step S104 in the following processing. In addition, the diffusion degree change amount calculator 222 reads the current diffusion degree S0(Sx0, Sy0) stored in the storage 223 and calculates the diffusion degree change amount ΔS(ΔSx, ΔSy) by using Expressions (5), (6), (7), and (8) above.

In the present embodiment as well, in a case where the illumination devices 1_1, 1_2, . . . , 1_*n* are to be controlled by the control device 200, the first modification illustrated in FIG. 15 or the second modification illustrated in FIG. 16 is applicable as in the first embodiment. Specifically, in a case where the illumination devices 1_1, 1_2, . . . , 1_*n* are to be controlled by the control device 200, at step S107, the control device 200 may sequentially transmit the diffusion degree change amount ΔS(ΔSx, ΔSy) to the illumination devices 1_1, 1_2, . . . , 1_*n*, or when the diffusion degree change amount ΔS(ΔSx, ΔSy) is transmitted from the control device 200 to each of the illumination devices 1_1, 1_2, . . . , 1_*n*, different control delay times t1, t2, . . . tn may be set to the illumination devices 1_1, 1_2, . . . , 1_*n*, respectively, and transmitted together with the diffusion degree change amount ΔS(ΔSx, ΔSy) so that drive voltage control is simultaneously executed at the illumination devices 1_1, 1_2, . . . , 1_*n*.

Note that, in a case where the illumination devices 1_1, 1_2, . . . , 1_*n* are to be controlled by the control device 200, the current diffusion degree S0(Sx0, Sy0) acquired at step S101*b* may be the current diffusion degree S0(Sx0, Sy0) of any of the illumination devices 1_1, 1_2, . . . , 1_*n*. Specifically, for example, any of the illumination devices 1_1, 1_2, . . . , 1_*n* may be explicitly designated so that the diffusion degree request command is transmitted at step S101*a* and the current diffusion degree S0(Sx0, Sy0) of the designated illumination device 1 is acquired at step S101*b*, or priority orders may be provided to the illumination devices 1_1, 1_2, . . . , 1_*n* so that the current diffusion degree S0(Sx0, Sy0) of the illumination device 1 at the highest priority order is acquired.

Figure 20:
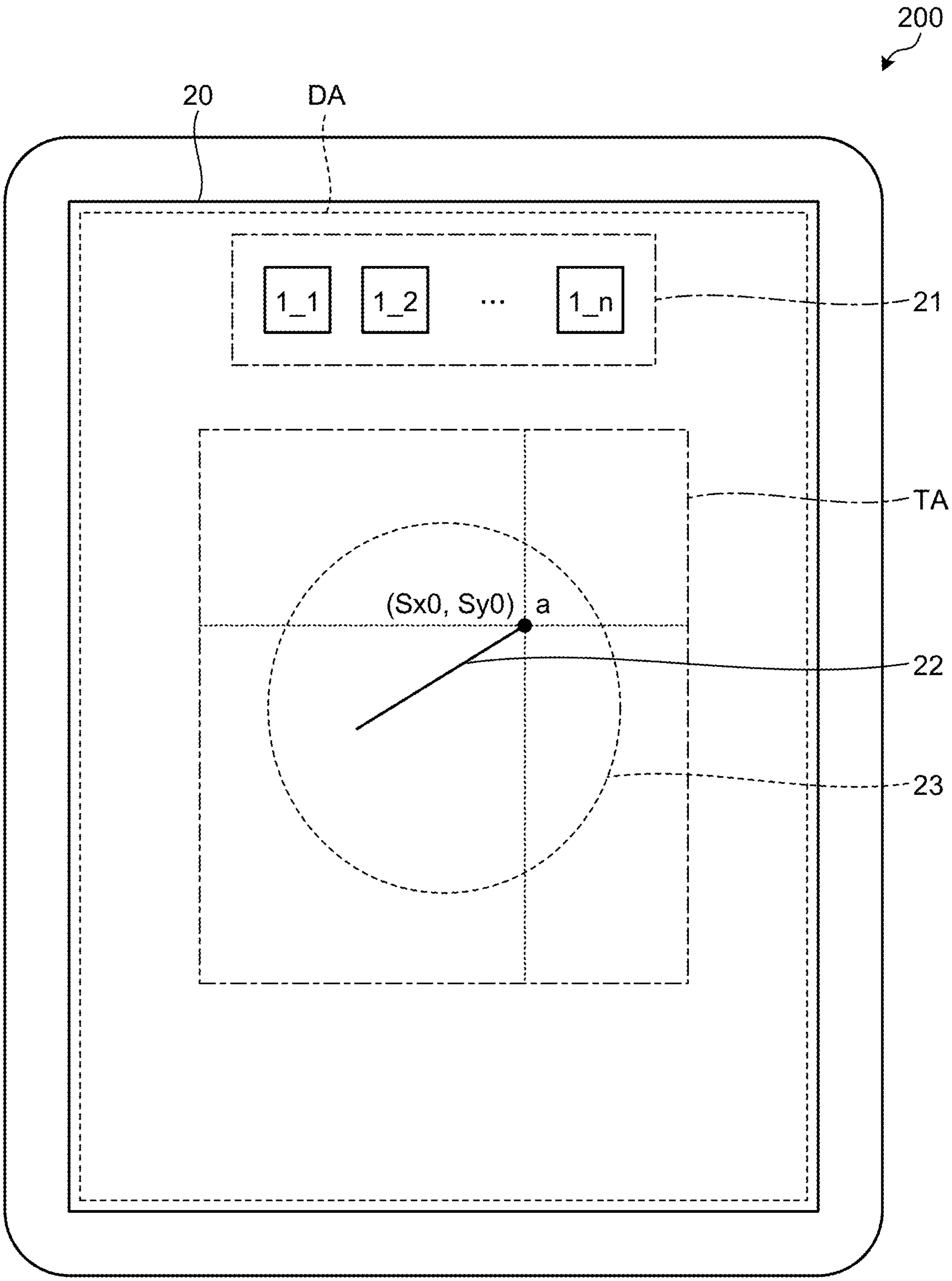
FIG. 20 is a conceptual diagram illustrating an exemplary display aspect on the display panel according to the second embodiment.

FIG. 20 is a conceptual diagram illustrating an exemplary display aspect on the display panel according to the second embodiment.

As illustrated in FIG. 20, the current diffusion degree S0(Sx0, Sy0) corresponding to the current touch detection position "a" is displayed. In addition, as illustrated in FIG. 20, a schematic shape image 23 of the irradiation area corresponding to the current diffusion degree S0(Sx0, Sy0) is displayed in the diffusion degree adjustment region TA. The schematic shape image 23 of the irradiation area may be displayed in a region outside the diffusion degree adjustment region TA in the display region DA. The schematic shape image 23 of the irradiation area may be displayed in an optional region in the display region DA, and the present disclosure is not limited by the display position of the schematic shape image 23 of the irradiation area.

Third Embodiment

Figure 21:
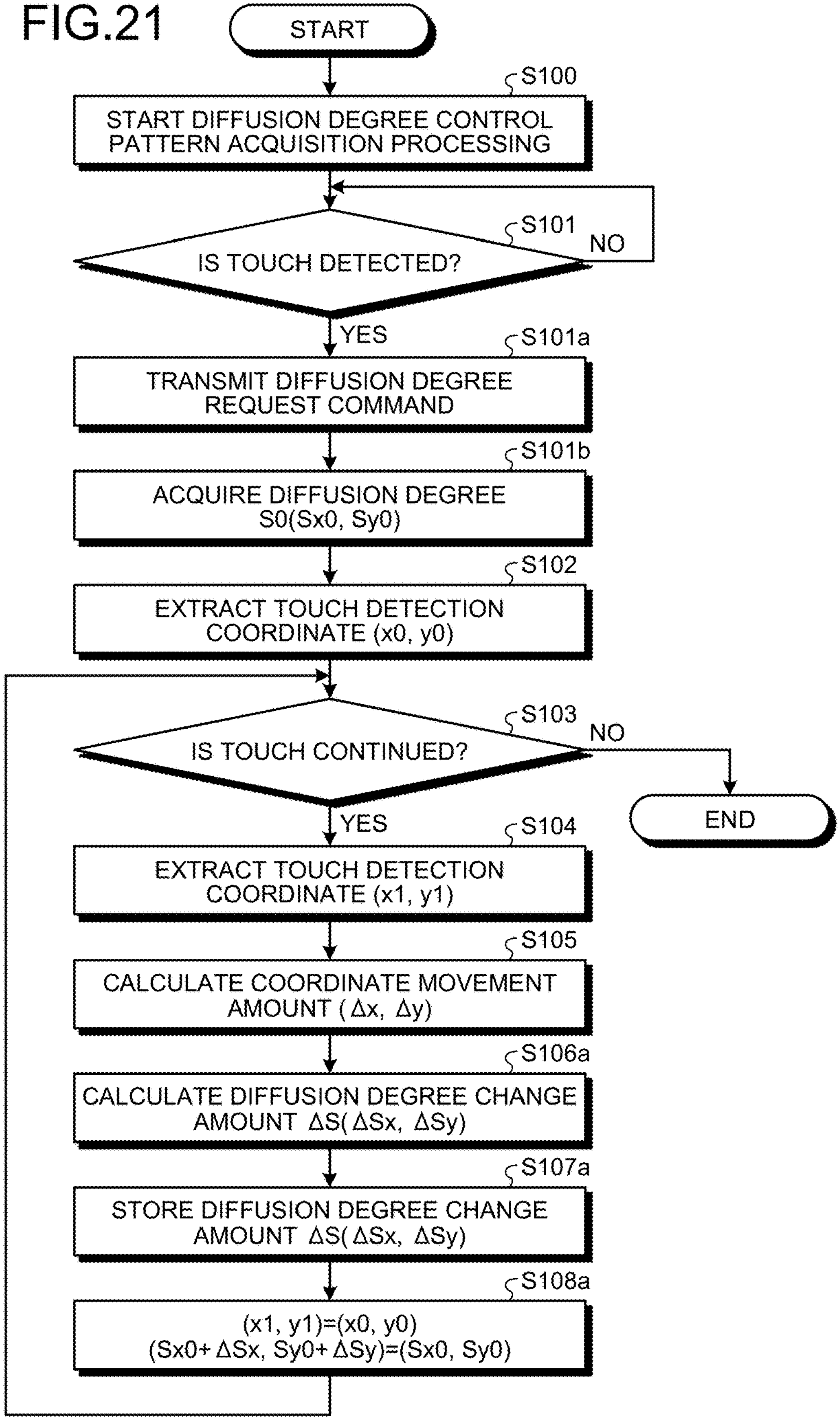
FIG. 21 is a flowchart illustrating an example of diffusion degree control pattern acquisition processing at the control device according to a third embodiment.
Figure 22:
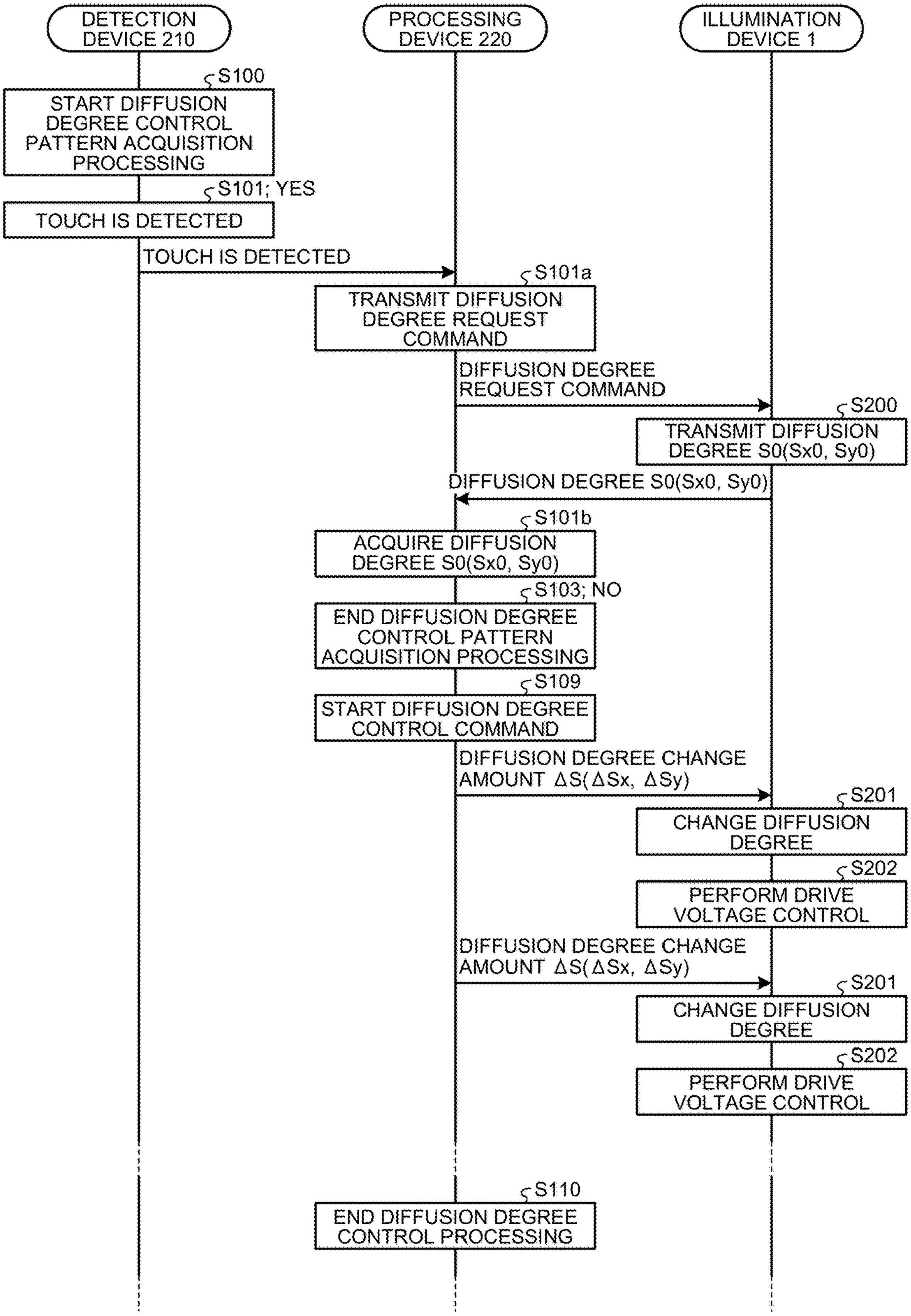
FIG. 22 is a sequence diagram illustrating a specific example of the diffusion degree control processing on an illumination device in a light modulation system according to the third embodiment.

A third embodiment will be described below with an example in which a diffusion degree control pattern of an illumination device 1 is acquired in advance by the control device 200 and the diffusion degree control processing on the illumination device 1 is executed at a predetermined timing based on the diffusion degree control pattern acquired by the control device 200. FIG. 21 is a flowchart illustrating an example of diffusion degree control pattern acquisition processing at the control device according to the third embodiment. FIG. 22 is a sequence diagram illustrating a specific example of the diffusion degree control processing on an illumination device in the light modulation system according to the third embodiment. Note that, in the following description, the same constituent component or processing as described above in the first and second embodiments is denoted by the same reference sign and duplicate description thereof is omitted, whereas any difference from the first and second embodiments will be described below.

When the diffusion degree control pattern acquisition processing on the illumination device 1 is started (step S100), the detector 211 detects existence of a touch in the diffusion degree adjustment region TA of the touch sensor 30 (step S101).

In a case where no touch is detected at step S101 (No at step S101), the detector 211 repeatedly executes the processing at step S101.

In a case where a touch is detected in the diffusion degree adjustment region TA by the detector 211 (Yes at step S101), the processing device 220 transmits a diffusion degree request command to the illumination device 1 through the communication means 300 (step S101*a*). The illumination device 1 transmits the current diffusion degree S0(Sx0, Sy0) to the control device 200 through the communication means 300 in accordance with the diffusion degree request command from the control device 200 (step S200). The control device 200 acquires the current diffusion degree S0(Sx0, Sy0) transmitted from the illumination device 1 through the communication means 300 (step S101*b*). Alternatively, the diffusion degree S0(Sx0, Sy0) stored in the storage 223 in advance upon execution of the diffusion degree control processing described above in the second embodiment may be applied.

After having calculated the diffusion degree change amount ΔS(ΔSx, ΔSy) for the illumination device 1 to be controlled at step S106*a*, the diffusion degree change amount calculator 222 stores the calculated diffusion degree change amount ΔS(ΔSx, ΔSy) in the storage 223 (step S107*a*).

In a case where the touch is not continued at step S103 (No at step S103), the diffusion degree control pattern acquisition processing on the illumination device 1 is ended.

Through the above-described diffusion degree control pattern acquisition processing, a diffusion degree control pattern is acquired, the diffusion degree control pattern including a plurality of the diffusion degree change amounts ΔS(ΔSx, ΔSy) sequentially acquired in chronological order from touch detection at step S101 to touch continuation stop at step S103 (No at step S103). In an example illustrated in FIG. 23, the diffusion degree change amount ΔS(ΔSx, ΔSy) from coordinate A to coordinate B is acquired in the diffusion degree control pattern acquisition processing.

After the diffusion degree control pattern acquisition processing on the illumination device 1 is ended, the control device 200 starts the diffusion degree control processing on the illumination device 1 at a predetermined timing (step S109).

Figure 23:
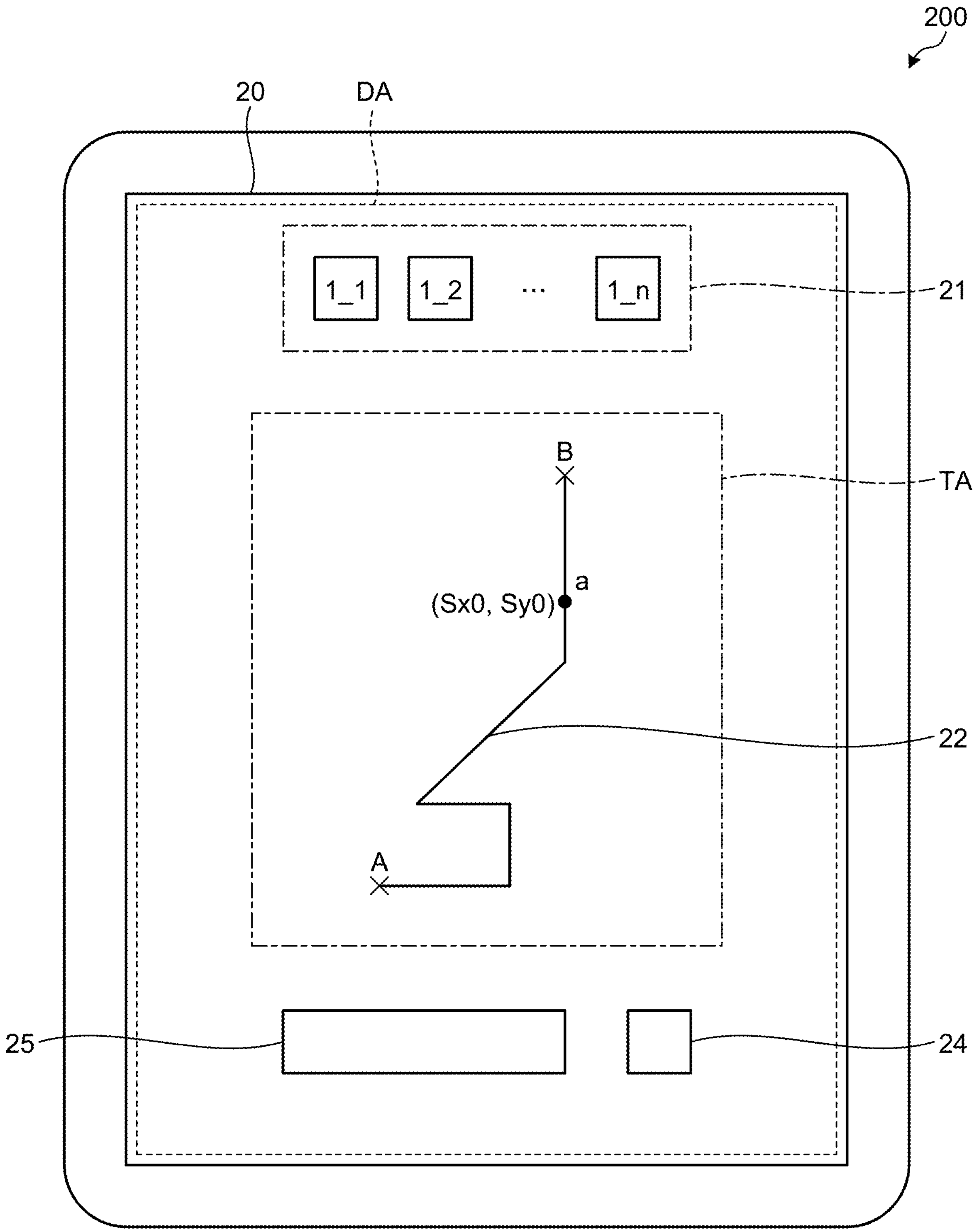
FIG. 23 is a conceptual diagram illustrating an exemplary display aspect on the display panel for setting a start timing of the diffusion degree control processing according to the third embodiment.

Start timing of the diffusion degree control processing on the illumination device 1 is set by the control device 200. FIG. 23 is a conceptual diagram illustrating an exemplary display aspect on the display panel for setting the start timing of the diffusion degree control processing according to the third embodiment.

As illustrated in FIG. 23, for example, a diffusion degree control processing start icon 24 for starting the diffusion degree control processing on the illumination device 1 and a setting dialog 25 for setting an execution time (time from coordinate A to coordinate B illustrated in FIG. 23) of the diffusion degree control processing are provided in a region (in the example illustrated in FIG. 23, a region on the lower side of the diffusion degree adjustment region TA) outside the diffusion degree adjustment region TA in the display region DA. At step S109, the diffusion degree control processing on the illumination device 1 is started by, for example, setting the execution time of the diffusion degree control processing to the setting dialog 25 and selecting the diffusion degree control processing start icon 24. Note that, for example, the execution time of the diffusion degree control processing may be set to the setting dialog 25 before the diffusion degree control pattern acquisition processing on the illumination device 1 is started. Alternatively, a start time point or execution interval of the diffusion degree control processing may be set to the setting dialog 25.

When the diffusion degree control pattern acquisition processing on the illumination device 1 is ended (No at step S103), the control device 200 starts the diffusion degree control processing upon selection of the diffusion degree control processing start icon 24 illustrated in FIG. 23 (step S109). Alternatively, for example, the diffusion degree control processing may be started at the start time point of the diffusion degree control processing, which is set to the setting dialog 25 illustrated in FIG. 23.

The control device 200 reads the diffusion degree control pattern stored in the storage 223 and transmits the diffusion degree change amounts ΔS(ΔSx, ΔSy) from coordinate A to coordinate B illustrated in FIG. 23 to the illumination device 1 through the communication means 300 in order of acquisition in the diffusion degree control pattern acquisition processing on the illumination device 1.

The illumination device 1 changes the diffusion degree of light in the Dx and Dy directions in accordance with the diffusion degree change amounts ΔS(ΔSx, ΔSy) sequentially transmitted from the control device 200 (step S201) and performs drive voltage control of the drive electrodes 10 and 13 of the first liquid crystal cell 2 and the second liquid crystal cell 3 (step S202).

When transmission of all diffusion degree change amounts ΔS(ΔSx, ΔSy) acquired in the diffusion degree control pattern acquisition processing is completed, the diffusion degree control processing is ended (step S110).

Note that, after the diffusion degree control processing is ended at step S110, the process may return to step S109 to start the diffusion degree control processing again. In this case, for example, a diffusion degree control processing repeat icon (not illustrated) for repeatedly executing the diffusion degree control processing on the illumination device 1 may be provided in a region outside the diffusion degree adjustment region TA in the display region DA. Moreover, the number of repetitions of the diffusion degree control processing on the illumination device 1 may be settable in the setting dialog 25, and a duration in which the diffusion degree control processing on the illumination device 1 is to be repeated may be settable.

Through the diffusion degree control pattern acquisition processing and the diffusion degree control processing described above, the irradiation area of light from the illumination device 1 can be changed by using the control device 200 exemplified by a portable communication terminal device such as a smartphone or a tablet based on the diffusion degree control pattern acquired in advance.

Figure 24:
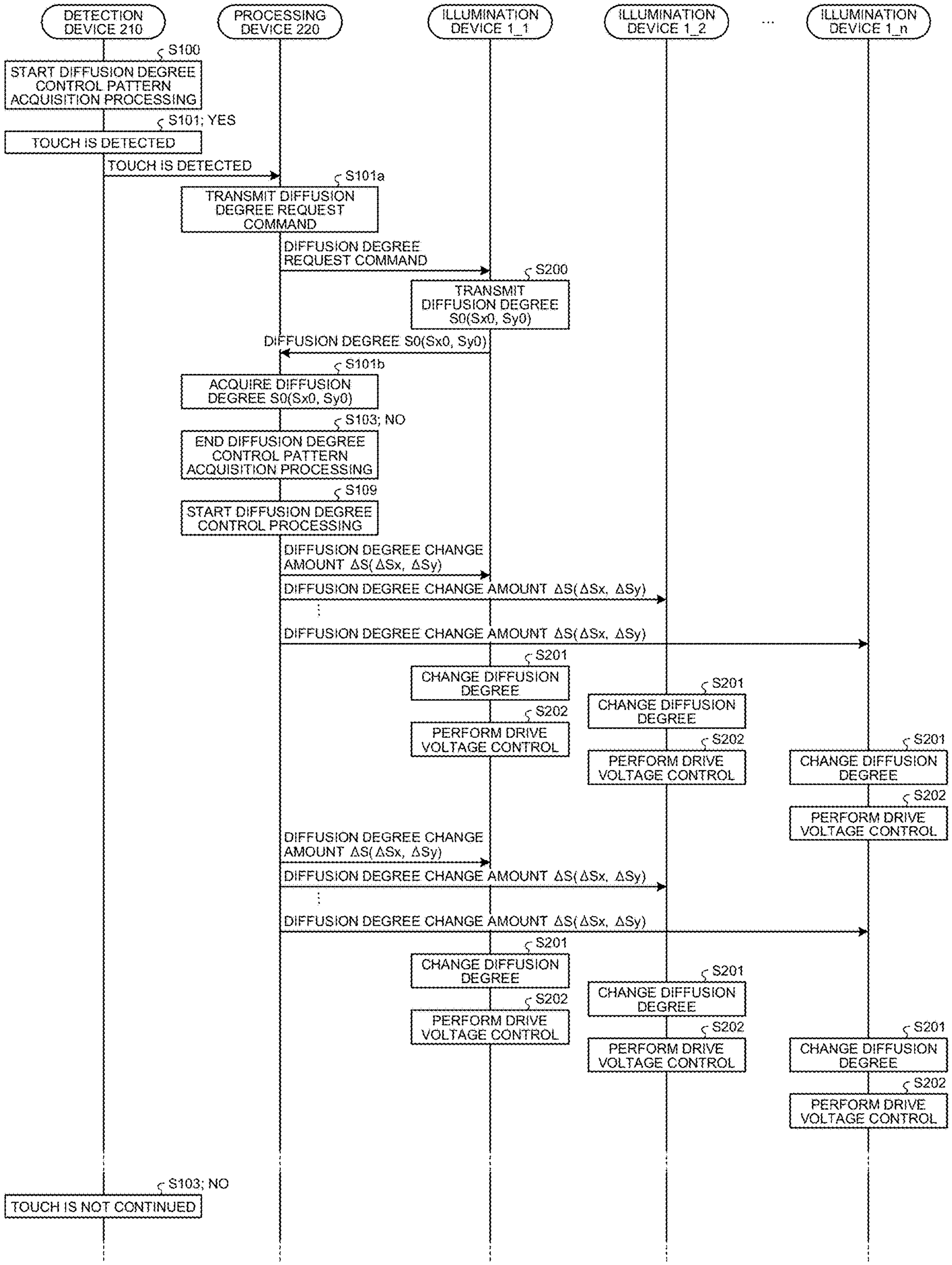
FIG. 24 is a sequence diagram illustrating a first modification of the diffusion degree control processing on each illumination device in the light modulation system according to the third embodiment.
Figure 25:
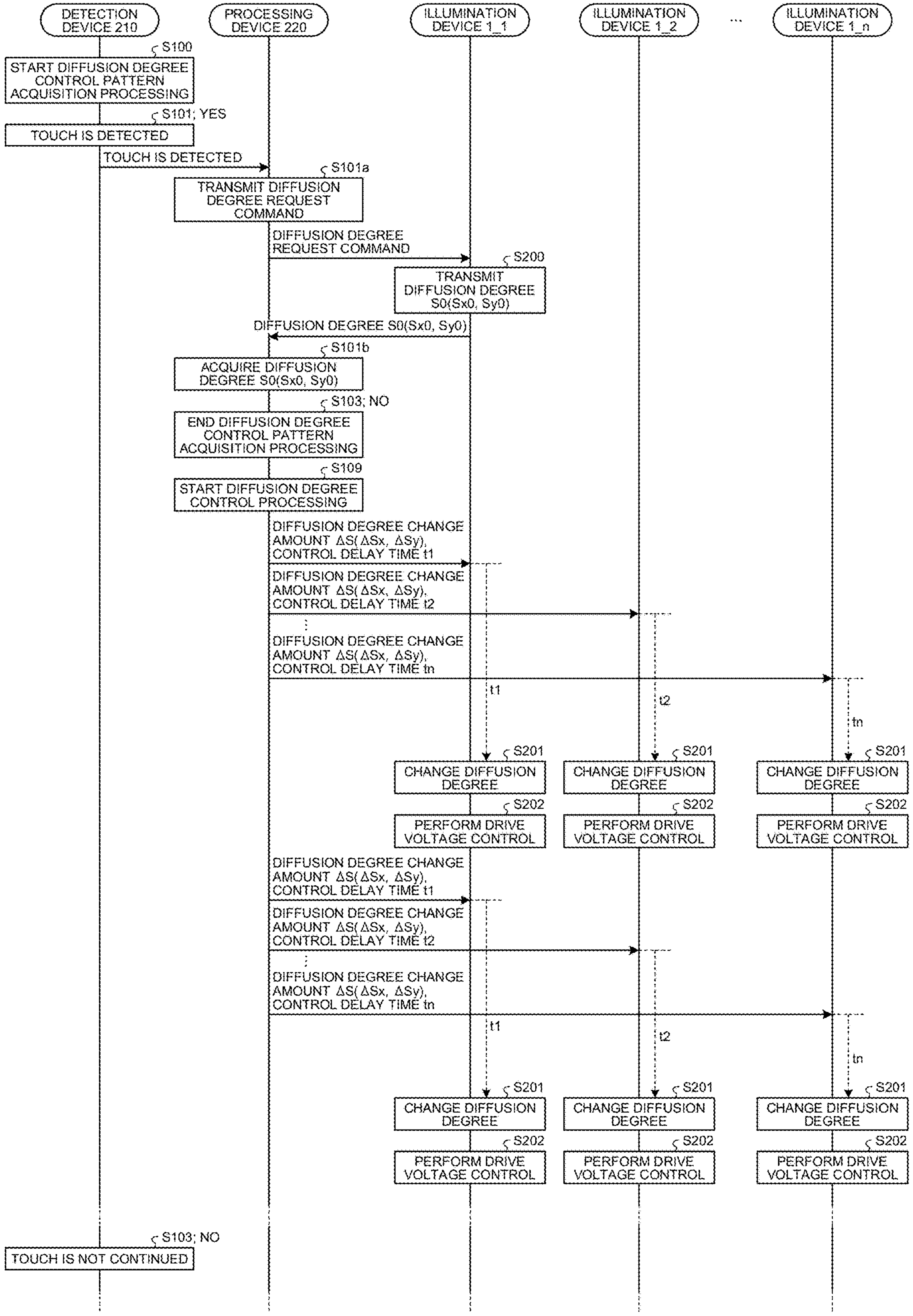
FIG. 25 is a sequence diagram illustrating a second modification of the diffusion degree control processing on each illumination device in the light modulation system according to the third embodiment.

FIG. 24 is a sequence diagram illustrating a first modification of the diffusion degree control processing on each illumination device in the light modulation system according to the third embodiment. FIG. 25 is a sequence diagram illustrating a second modification of the diffusion degree control processing on each illumination device in the light modulation system according to the third embodiment. Description of FIGS. 24 and 25 corresponds to a case where the illumination devices 1_1, 1_2, . . . , **1_*n* are to be controlled by the control device 200**.

In a case where the illumination devices 1_1, 1_2, . . . , **1_*n* are to be controlled by the control device 200, the control device 200 may sequentially transmit the diffusion degree change amount ΔS(ΔSx, ΔSy) to the illumination devices 1_1, 1_2, . . . , 1_*n* as illustrated in FIG. 24 in the diffusion degree control processing at step S109 or later, or when the diffusion degree change amount ΔS(ΔSx, ΔSy) is transmitted from the control device 200 to each of the illumination devices 1_1, 1_2, . . . , 1_*n*, different control delay times t1, t2, . . . , tn may be set to the illumination devices 1_1, 1_2, . . . , 1_*n*, respectively, and transmitted together with the diffusion degree change amount ΔS(ΔSx, ΔSy) so that drive voltage control is simultaneously executed at the illumination devices 1_1, 1_2, . . . , 1_***n*, as illustrated in FIG. 25.

Note that, in a case where the illumination devices 1_1, 1_2, . . . , 1_*n* are to be controlled by the control device 200, the current diffusion degree S0(Sx0, Sy0) acquired at step S101*b* may be the current diffusion degree S0(Sx0, Sy0) of any of the illumination devices 1_1, 1_2, . . . , 1_*n*. Specifically, for example, any of the illumination devices 1_1, 1_2, . . . , 1_*n* may be explicitly designated so that the diffusion degree request command is transmitted at step S101*a* and the current diffusion degree S0(Sx0, Sy0) of the designated illumination device 1 is acquired at step S101*b*, or priority orders may be provided to the illumination devices 1_1, 1_2, . . . , 1_*n* so that the current diffusion degree (Sx0, Sy0) of the illumination device 1 at the highest priority order is acquired. In the examples illustrated in FIGS. 24 and 25, the current diffusion degree S0(Sx0, Sy0) of the illumination device 1_1 is acquired.

Figure 26:
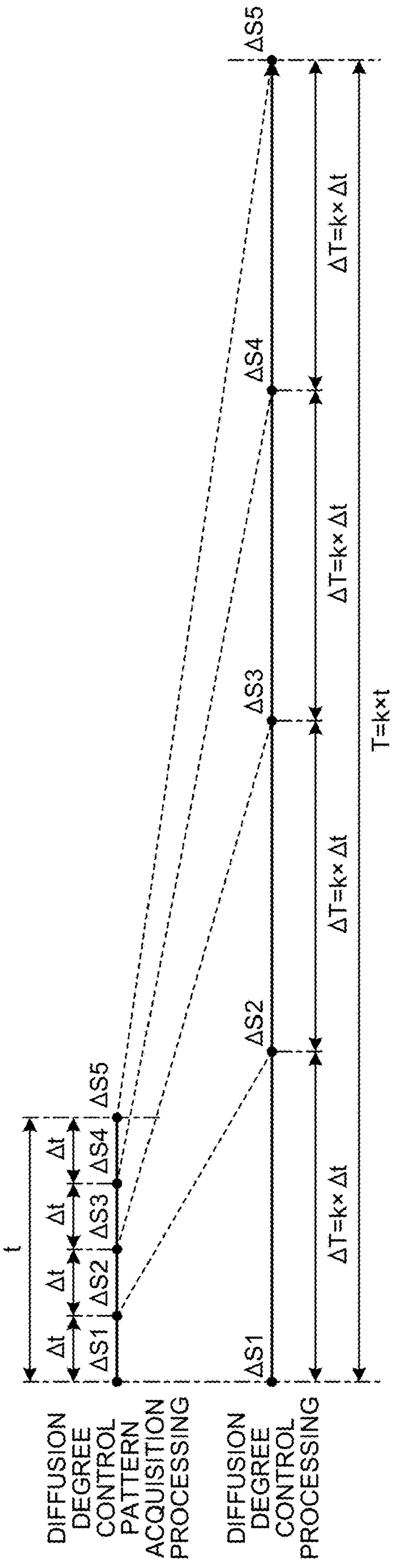
FIG. 26 is a conceptual diagram illustrating the relation between an execution time of the diffusion degree control pattern acquisition processing and an execution time of the diffusion degree control processing.

FIG. 26 is a conceptual diagram illustrating the relation between the execution time of the diffusion degree control pattern acquisition processing and the execution time of the diffusion degree control processing. FIG. 26 illustrates an example in which an execution time (time from coordinate A to coordinate B illustrated in FIG. 23) T (=k×t) of the diffusion degree control processing obtained by multiplying an execution time t of the diffusion degree control pattern acquisition processing by k is set to the setting dialog 25 illustrated in FIG. 23.

In this case, a transmission interval ΔT of diffusion degree change amounts ΔS1, ΔS2, ΔS3, ΔS4, and ΔS5 acquired in the diffusion degree control pattern acquisition processing is a value (ΔT=k×Δt) obtained by multiplying an acquisition interval Δt of the diffusion degree change amounts ΔS1, ΔS2, ΔS3, ΔS4, and ΔS5 in the diffusion degree control pattern acquisition processing by k.

Note that the execution time T of the diffusion degree control processing is not limited to the aspect of setting a multiplying factor (k) for the execution time t of the diffusion degree control pattern acquisition processing, but for example, the execution time T of the diffusion degree control processing may be directly set. In this case, the processing device 220 may calculate the multiplying factor (k) of the execution time T of the diffusion degree control processing for the execution time t of the diffusion degree control pattern acquisition processing and calculate the transmission interval ΔT (=k×Δt) of the diffusion degree change amounts ΔS by multiplying the acquisition interval Δt of the diffusion degree change amounts ΔS in the diffusion degree control pattern acquisition processing by k.

The preferable embodiments of the present disclosure are described above, but the present disclosure is not limited to such embodiments. Contents disclosed in the embodiments are merely exemplary, and various kinds of modifications are possible without departing from the scope of the present disclosure. Any modification performed as appropriate without departing from the scope of the present disclosure belongs to the technical scope of the present disclosure.

The invention claimed is:

1. A control device of an illumination device capable of controlling a diffusion degree of light emitted from a light source, the control device comprising:

a detection device provided with a diffusion degree adjustment region of the illumination device in a detection region where a plurality of detection elements are provided; and a processing device configured to control a diffusion degree change amount of the illumination device in accordance with a movement amount of a touch detection position in the diffusion degree adjustment region, wherein the processing device calculates the diffusion degree change amount corresponding to a first directional component of the movement amount of the touch detection position in the diffusion degree adjustment region, and calculates the diffusion degree change amount corresponding to a second directional component of the movement amount of the touch detection position in the diffusion degree adjustment region, the second directional component being different from the first directional component.

2. The control device of the illumination device according to claim 1, wherein the processing device transmits the diffusion degree change amount to the illumination device through a communication means.

3. The control device of the illumination device according to claim 2, wherein the processing device transmits the same diffusion degree change amount to a plurality of the illumination devices.

4. The control device of the illumination device according to claim 2, wherein the processing device transmits the same diffusion degree change amount to a plurality of the illumination devices and transmits mutually different control delay times to the illumination devices.

5. The control device of the illumination device according to claim 2, further comprising a storage configured to store a plurality of diffusion degree change amounts sequentially acquired in chronological order in a predetermined duration, wherein the processing device transmits the diffusion degree change amounts stored in the storage after the predetermined duration in order of acquisition in the predetermined duration.

6. The control device of the illumination device according to claim 5, wherein a transmission interval of the diffusion degree amounts is longer than an acquisition interval of the diffusion degree change amounts.

7. The control device of the illumination device according to claim 1, further comprising a display panel including a display region overlapping the detection region in a plan view, wherein the display panel displays a locus in accordance with movement of the touch detection position in a region overlapping the diffusion degree adjustment region in the display region.

8. The control device of the illumination device according to claim 7, wherein the display panel displays a schematic shape image of an irradiation area of light from the illumination device in accordance with the touch detection position in the diffusion degree adjustment region.

9. The control device of the illumination device according to claim 1, wherein the processing device calculates a diffusion degree change amount ΔSx in a first direction by using (1) below and calculates a diffusion degree change amount ΔSy in a second direction different from the first direction by using (2) below, $$\Delta Sx = Sx\max / X \times \Delta x \tag{1}$$

$$\Delta Sy = Sy\max / Y \times \Delta y \tag{2}$$

where X is a maximum coordinate of the diffusion degree adjustment region in the first direction, $\Delta x$ is the first directional component of the movement amount of the touch detection position in the diffusion degree adjustment region, Sxmax is a maximum value of the diffusion degree in the first direction, Y is a maximum coordinate of the diffusion degree adjustment region in the second direction, $\Delta y$ is the second directional component of the movement amount of the touch detection position in the diffusion degree adjustment region, and Symax is a maximum value of the diffusion degree in the second direction.

10. The control device of the illumination device according to claim 1, wherein the processing device calculates a diffusion degree change amount $\Delta Sx$ in a first direction by using Expression (3) or (4) below and calculates a diffusion degree change amount $\Delta Sy$ in a second direction different from the first direction by using Expression (5) or (6) below, $$\Delta Sx = (Sx\mathrm{max} - Sx0)/(X - x0) \times \Delta x \text{ (where } \Delta x \geq 0) \tag{3}$$

$$\Delta Sx = Sx0/x0 \times \Delta x \text{ (where } \Delta x < 0) \tag{4}$$

-continued $$\Delta Sy = (Sy\mathrm{max} - Sy0)/(Y - y0) \times \Delta y \text{ (where } \Delta y \geq 0) \tag{5}$$

$$\Delta Sy = Sy0/y0 \times \Delta y \text{ (where } \Delta y < 0) \tag{6}$$

where X is a maximum coordinate of the diffusion degree adjustment region in the first direction, x0 is the touch detection position in the first direction, Sx0 is the diffusion degree in the first direction at the touch detection position x0, $\Delta x$ is the first directional component of the movement amount of the touch detection position from the touch detection position x0, Sxmax is a maximum value of the diffusion degree in the first direction, Y is a maximum coordinate of the diffusion degree adjustment region in the second direction, y0 is the touch detection position in the second direction, Sy0 is the diffusion degree in the second direction at the touch detection position y0, $\Delta y$ is the second directional component of the movement amount of the touch detection position from the touch detection position y0, and Symax is a maximum value of the diffusion degree in the second direction.

* * * * *